(12) United States Patent
Sato

(10) Patent No.: US 8,255,832 B2
(45) Date of Patent: Aug. 28, 2012

(54) IMAGE PROCESSING DEVICE, IMAGE PROCESSING METHOD, AND STORAGE MEDIUM

(75) Inventor: Yuushi Sato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 498 days.

(21) Appl. No.: 12/494,194

(22) Filed: Jun. 29, 2009

(65) Prior Publication Data

US 2010/0017705 A1 Jan. 21, 2010

(30) Foreign Application Priority Data

Jul. 15, 2008 (JP) ................................. 2008-183899

(51) Int. Cl.
 G06F 17/00 (2006.01)
(52) U.S. Cl. ......... 715/838; 715/251; 715/243; 382/173
(58) Field of Classification Search .................. 358/1.15, 358/451; 382/112, 173; 715/838, 251
See application file for complete search history.

(56) References Cited

U.S. PATENT DOCUMENTS

| 7,383,494 | B2 * | 6/2008 | Krolczyk et al. | 715/200 |
|---|---|---|---|---|
| 2006/0007481 | A1 * | 1/2006 | Kato et al. | 358/1.15 |
| 2006/0056660 | A1 * | 3/2006 | Tojo | 382/112 |
| 2007/0070442 | A1 * | 3/2007 | Ohkubo | 358/451 |
| 2009/0132957 | A1 * | 5/2009 | Reddy | 715/786 |

FOREIGN PATENT DOCUMENTS

| JP | 2-217850 | 8/1990 |
|---|---|---|
| JP | 2000-298569 | 10/2000 |
| JP | 2002-196257 | 7/2002 |
| JP | 2002-305649 | 10/2002 |
| JP | 2003-8876 | 1/2003 |
| JP | 2005-20419 | 1/2005 |
| JP | 2006-23942 | 1/2006 |
| JP | 2006-279892 | 10/2006 |
| JP | 2007-88767 | 4/2007 |
| JP | 2007-125875 | 5/2007 |
| JP | 2007-174270 | 7/2007 |
| JP | 2007-194939 | 8/2007 |

OTHER PUBLICATIONS

Japanese Office Action dated Apr. 13, 2012 issued during prosecution of related Japanese application No. 2008-183899.

* cited by examiner

*Primary Examiner* — Adam M Queler
*Assistant Examiner* — Aaron Johnson
(74) *Attorney, Agent, or Firm* — Fitzpatrick, Cella, Harper & Scinto

(57) ABSTRACT

When an N-upped paper document was viewed by previewing, visibility thereof was poor because contents corresponding to N pages are displayed collectively. Expansion thereof for improving the visibility makes the operability poor. An image processing device of the present invention includes: a determining unit for determining whether or not image data corresponding to an inputted document is image data of an N-up document in which contents corresponding to N pages (N≧2) are arranged in one page; a first thumbnail generating unit for generating a first thumbnail of 1-up that is a thumbnail of any of the N pages when the image data corresponding to the inputted document is determined to be the image data of the N-up document by the determining unit; and a display unit for preview-displaying the first thumbnail.

10 Claims, 21 Drawing Sheets

IMAGE PROCESSING DEVICE, IMAGE PROCESSING METHOD, AND STORAGE MEDIUM

BACKGROUND OF THE INVENTION

1. Field of the Invention

The present invention relates to an image processing device having a preview function, an image processing method, a program and storage medium thereof.

2. Description of the Related Art

A technology converting a bitmap image inputted by an image input device into drawing data independent on resolution of the image input device has been developed (for example, refer to Japanese Patent Laid-Open No. 2006-23942). Processing converting a bitmap image into data independent on the resolution as above is called vectorization or vectorize, and the data acquired as a result of the vectorization are called vector data. In the technology of such vectorization, sub-information acquired at the time of generating the vector-data can be utilized as additional information not actually printed. This additional information is also called metadata. Since a variety of information can be added to the metadata, it is considered that the information needed for implementing a function is stored as the metadata.

A technology for performing region division from the bitmap has been developed. The region division is a processing that analyzes the inputted bitmap image data, divides the data into a region for every group of objects included in the image, and determines and categorizes an attribute of the each region. It is considered that the above-mentioned metadata is stored for each of the region-divided object groups.

If an image inputted from the image input device is stored as a file in a secondary storage in an image output device, a user can extract the image at any time and output it repeatedly. A function of storing the input data in a file format in the secondary storage of the image output device aiming at the reuse is called a box function, and such a file system is also called a box.

Although files in the box are the bitmap and vector data mentioned above, it becomes difficult to find out a target file from list information such as a file name and a thumbnail when the stored files increases.

Then, if the user inputs a keyword included in the target file from an operation part, and performs list display of only the files that match the keyword using a retrieval function, the user's convenience is remarkably improved.

When retrieving the object in the box, a user inputs a keyword from the operation part, and an object having the metadata corresponding to the keyword is detected.

From among a plurality of retrieval results preview-displayed on the operation part, the user will select the corresponding one, and at this time, a page region having low visibility may exist in the selected document. Therefore, a technology for determining, when the selected document is outputted, whether the page region having low visibility exists in a plurality of image data laid out in one page has been also developed (refer to Japanese Patent Laid-Open No. 2007-174270).

In the above-mentioned preview-display, there exists a case where a paper document in which N pages of contents have been reduced-printed collectively on one sheet of paper is taken in by scanning and its data is stored in the box, and the data(N-up document) is preview. Suppose that the user performs the retrieval, and the object corresponding to the retrieval key word is detected in the data of the N-up document in this case. At this time, a case may exist where the detected object corresponds to only one page in N pages in the N-up document.

However, since a layout number N of the scanned N-up document cannot be recognized at the device side, all N pages will have been displayed in spite of there being only one page corresponding to the retrieval key word. Therefore, the visibility may be reduced and furthermore, unnecessary information may also be displayed.

When the preview is enlarged in order to improve the visibility, the user may take time and effort, and there exists a problem that operability will be reduced.

Likewise, even in the printing of the above-mentioned N-up document, a request that the user desires to print the document with 1-up (that is, layout number N=1) or the document with the layout number altered arbitrarily due to the poor visibility has not been able to be dealt with.

SUMMARY OF THE INVENTION

The present invention improves the user's convenience of the N-up document.

An image processing device of a first aspect of the present invention includes:
 a determining unit for determining whether or not image data corresponding to an inputted document is image data of an N-up document in which contents corresponding to N pages ($N \geq 2$) are arranged in one page;
 a first thumbnail generating unit for generating a first thumbnail of 1-up that is a thumbnail of any of the N pages when the image data corresponding to the inputted document is determined to be the image data of the N-up document by the determining unit; and
 a display unit for preview-displaying the first thumbnail.

Further features of the present invention will become apparent from the following description of exemplary embodiments (with reference to the attached drawings).

BRIEF DESCRIPTION OF THE DRAWINGS

FIG. 17 is a diagram showing the relationship of FIGS. 17A and 17B;

DESCRIPTION OF THE EMBODIMENTS

Hereinafter, the best mode for carrying out the present invention will be described with reference to figures.

Embodiment 1

Structure of Image Processing Device

Figure 1:
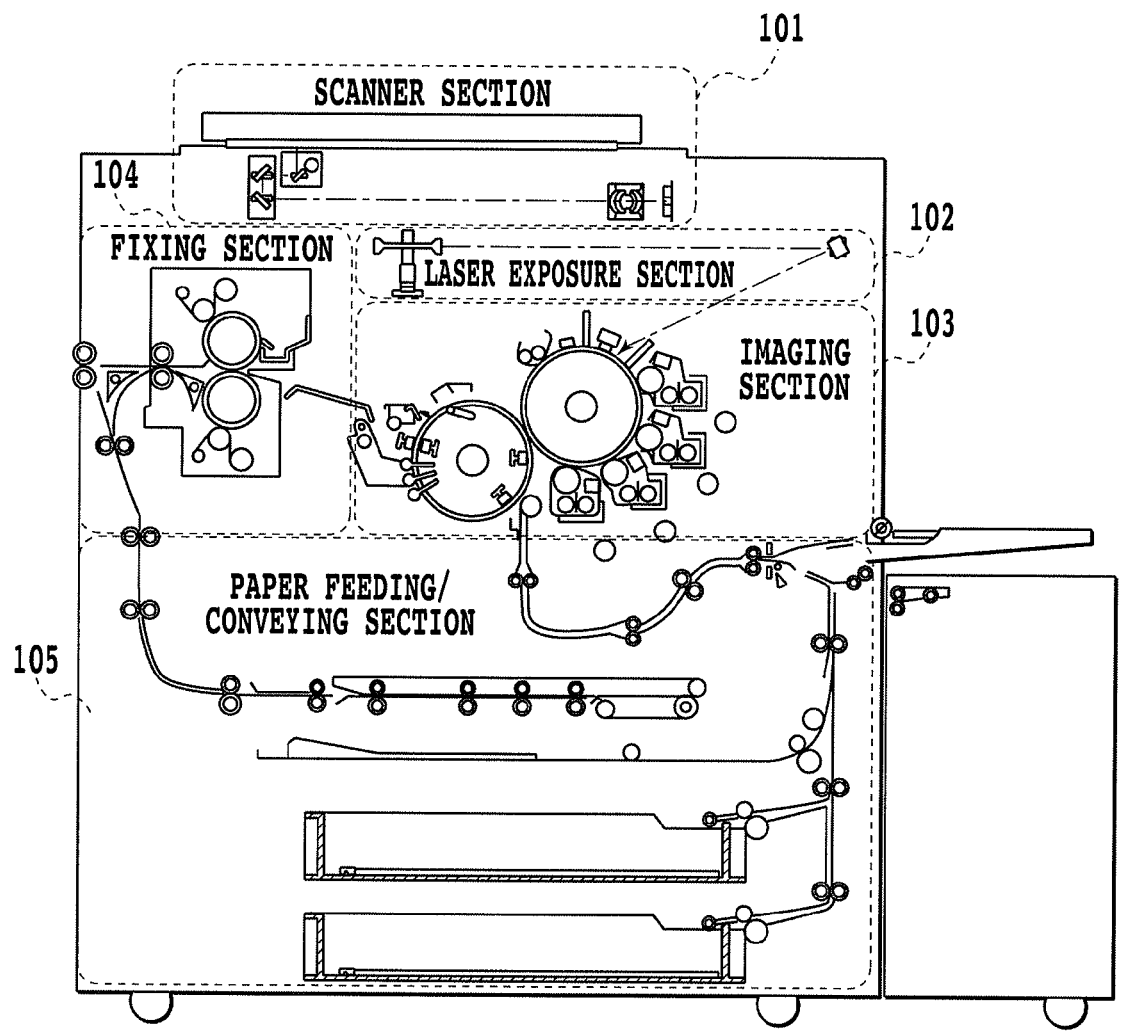
FIG. 1 is a sectional side view illustrating a structure of a printing device (MFP: Multi Function Peripheral) of an embodiment of the present invention.

First, a structure of a 1D color system MFP (Multi Function Peripheral device) to which a first embodiment of the present invention is preferably applied will be described using FIG. 1.

The 1D color system MFP includes a scanner section 101, a laser exposure section 102, an imaging section 103 provided with a photosensitive drum, a fixing section 104, a paper feeding/conveying section 105, and a not shown printer control section that controls these.

The scanner section 101 is unit for reading a image optically while illuminating the paper document placed on a platen, and converting the image into image data of an electrical signal.

The laser exposure section 102 enters a light ray such as a laser beam modulated according to the image data onto a rotating polygon mirror (polygon mirror) rotating with a constant angular velocity, and irradiates the photosensitive drum with the reflected scanned light.

The imaging section 103 charges the photosensitive drum by a charger while rotationally driving the drum. Then, the imaging section 103 develops with toner a latent image formed on the photosensitive drum by the laser exposure section 102, and transfers the toner image on a sheet. The imaging section 103 carries out a sequence of electrophotographic processes such as collecting fine toner remaining on the photosensitive drum without being transferred in that case, and forms the image. In that case, while the photosensitive drum rotates four times with the sheet wound at a predetermined position of a transferring belt, each development unit (development station) having the toner of a magenta (M), a cyan (C), a yellow (Y), and a black (K) carries out, in turn, the electrophotographic process one after another. After four rotations, the sheet having the full-color-toner image of four colors transferred thereon leaves the transfer drum, and is conveyed to the fixing section 104.

The fixing section 104 is made up of a combination of rollers and belts, incorporating a built-in heat source such as a halogen heater, and dissolves and fixes by heat and pressure the toner on the sheet having the toner image transferred thereon by the imaging section 103.

The paper feeding/conveying section 105 has one or more sheet storages represented by a sheet cassette or a paper deck. The paper feeding/conveying section 105 separates one sheet out of a plurality of sheets stored in the sheet storage, and conveys the sheet to the imaging section 103 and then to the fixing section 104 according to instructions of the not shown printer control section. The sheet is wound around the transfer drum of the imaging section 103, and is conveyed to the fixing section 104 after the drum having rotated four times. Then, while the transfer drum rotates four times as mentioned above, the toner image of each color of YMCK is transferred on the sheet. In the case of forming images on both sides of the sheet, the paper feeding/conveying section 105 controls the sheet having passed the fixing section 104 so that the sheet passes again along the conveying path that leads to the imaging section 103.

The printer control section communicates with the MFP control part (not shown) that controls the overall MFP, and performs the control according to the instructions thereof. At the same time, the printer control section instructs the overall to be able to maintain harmony and operate smoothly, while administering the state of each of the scanner section 101, the laser exposure section 102, the imaging section 103, the fixing section 104, and the paper feeding/conveying section 105 mentioned above.

<Configuration of Controller Unit>

Then, a configuration of a controller unit of the MFP in the present embodiment will be described with reference to FIG. 2.

Figure 2:
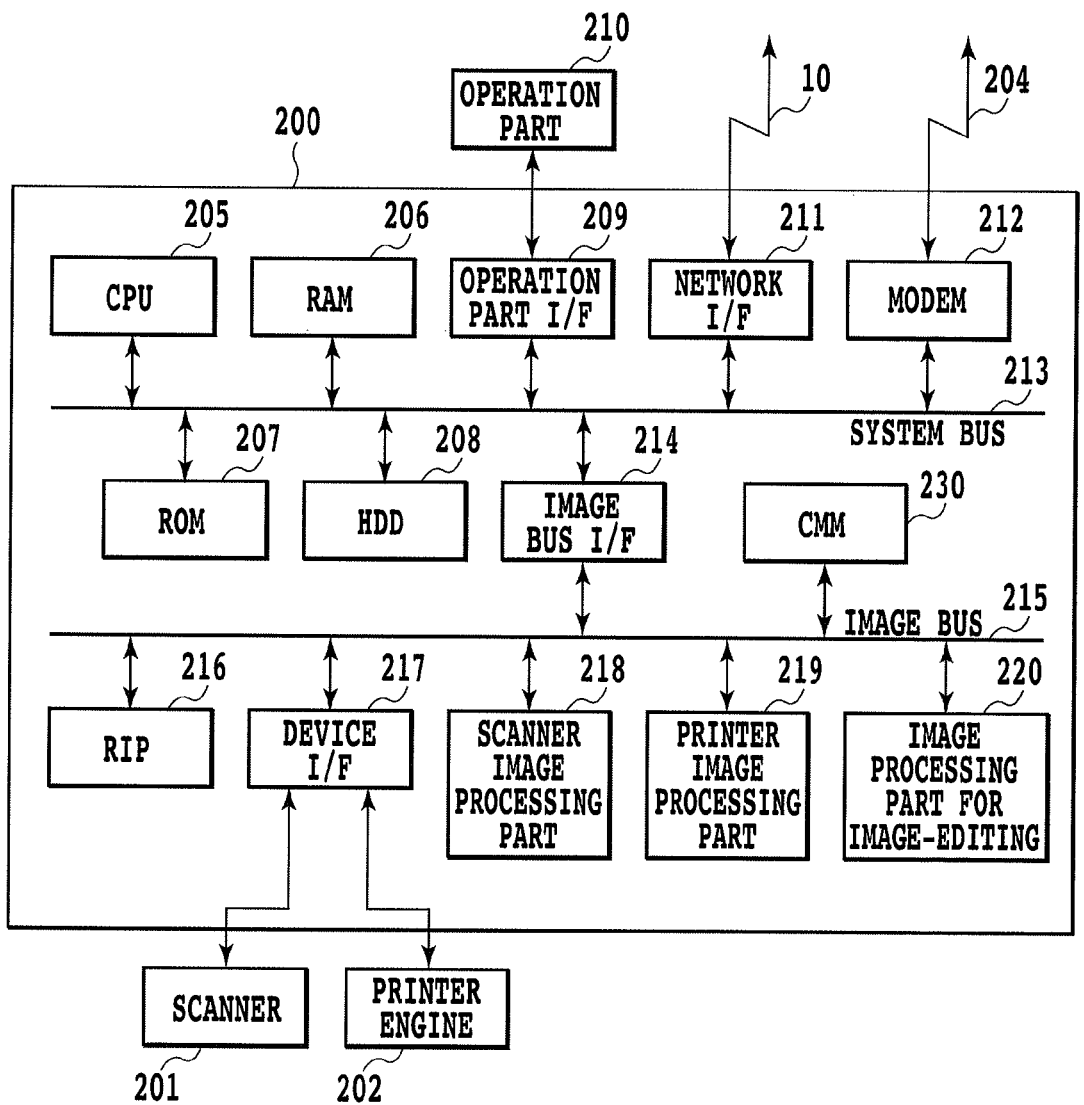
FIG. 2 is a block diagram illustrating an example of a configuration of a control unit of the MFP in the embodiment.

FIG. 2 is a block diagram illustrating an example of the configuration of the control unit (controller) of the MFP in the present embodiment. In FIG. 2, a control unit 200 is connected with a scanner 201 that is an image input device and a printer engine 202 that is an image output device, and performs the control for reading and printing out the image data. The control unit 200, when connected with a LAN 10 and a public line 204, also performs the control for inputting/outputting image information and device information via the LAN 10 and the public line 204.

A CPU 205 is a central processing unit for controlling the overall MFP. A RAM 206 is a system work memory for the CPU 205 to operate, and also an image memory for storing the inputted image data temporarily. A ROM 207 is a boot ROM and stores a boot program of the system. An HDD 208 is a hard disk drive and stores system software for a variety of processing and the inputted image data or the like.

An operation part I/F 209 is an interface part for an operation part 210 having a display screen that can display the image data, etc. and outputs operation screen data for the operation part 210. The operation part I/F 209 performs the role of giving information inputted from the operation part 210 by a user to the CPU 205.

A network interface 211 is realized by a LAN card or the like for example, and inputs/outputs information from/to an external device when connected with the LAN 10. A modem 212 inputs/outputs information from/to an external device when connected with the public line 204.

The above units are arranged on a system bus 213.

An image bus I/F 214 is an interface for connecting the system bus 213 and an image bus 215 that transfers the image data at high speed, and is a bus bridge that converts data structure. To the image bus 215, a raster image processor (RIP) 216, a device I/F 217, a scanner image processing part 218, a printer image processing part 219, an image processing part for image editing 220, and a color management module (CMM) 230 are connected.

The raster image processor (RIP) 216 develops a page description language (PDL) code and vector data mentioned later into a bitmap image (image data). The device I/F part 217 is an interface that connects the control unit 200 with the scanner 201 and the printer engine 202, and performs conversion between a synchronous system and asynchronous system of the image data.

The scanner image processing part 218 performs a variety of processing such as correction, retouching and editing for the image data inputted from the scanner 201. The printer image processing part 219 performs the processing such as the correction, the resolution conversion, or the like according to the printer engine for the image data to be printed out. The image processing part for image-editing 220 performs a variety of image processing such as rotation of the image data and compression/expansion processing of the image data. The CMM 230 is a dedicated hardware module that performs the color conversion processing (also called a color space conversion processing) based on a profile or calibration data for the image data. The profile is information like a function for converting color image data expressed by means of a color space dependent on a device into the color space independent on the device (for example, Lab etc.). The calibration data is the data for correcting a color reproduction characteristic of the scanner 201 and the printer engine 202 in a color multifunction device (MFP).

<Configuration of Controller Software>

Then, a configuration of controller software that controls operation of the MFP will be described with reference to FIG. 3.

Figure 3:
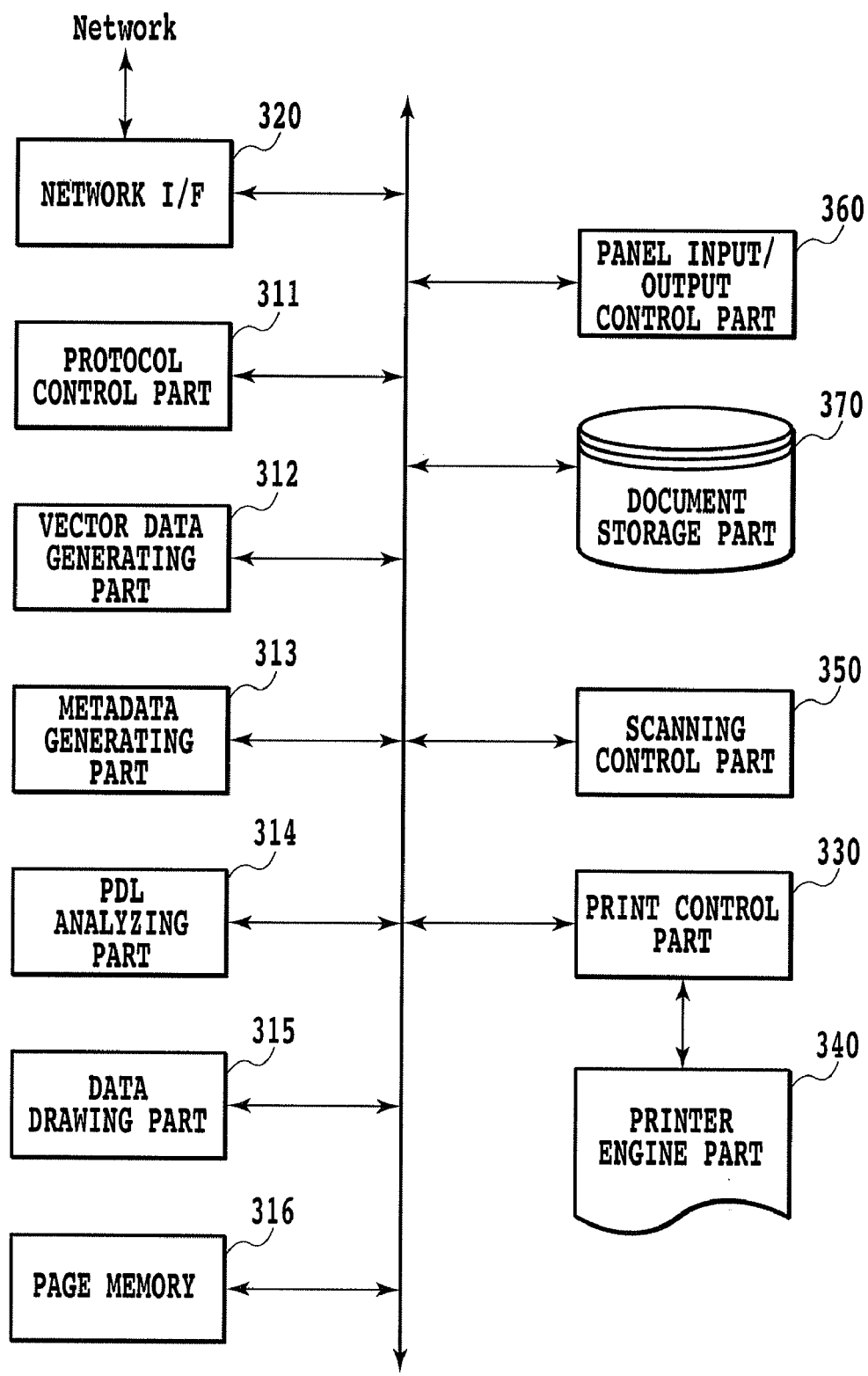
FIG. 3 is a block diagram illustrating an example of a configuration of controller software in the embodiment.

FIG. 3 is a block diagram illustrating the configuration of the controller software that controls the operation of the MFP. In FIG. 3, a part of control subjects of the controller software are also illustrated.

A network I/F 320 is an interface that manages an input/output of the information from and to an external device via a network.

A protocol control part 311 is a component that manages communication with the outside by analyzing a network protocol and by controlling transmission and reception.

A vector data generating part 312 is a component for generating (vectorizing), from the bitmap image, the vector data that is resolution-independent drawing description (a first conversion unit).

A metadata generating part 313 is a component for generating metadata based on sub-information acquired in the process of the vectorization by the vector data generating part 312 (a second conversion unit). The metadata is additional data that is not necessary in a drawing processing. The metadata generating part 313 selects the metadata having a low usage frequency and deletes the selected metadata having the low usage frequency.

A PDL analyzing part 314 is a component for analyzing a PDL code and converting the code into an intermediate code (Display List) having a format easier to be processed (a third conversion unit). The intermediate code generated in the PDL analyzing part 314 is given to a data drawing part 315, and is processed.

The data drawing part 315 is a component for developing the above-mentioned intermediate code into the bitmap data. The developed bitmap data is sequentially drawn in a page memory 316.

The page memory 316 is a volatile memory storing temporally the bitmap data developed by the data drawing part 315 that is a renderer.

A panel I/O control unit 360 is a component for controlling the input/output from and to a control panel provided at the MFP.

A document storage part 370 is unit for storing the vector data, Display List and a data file including the metadata in the unit of a job of an input document and is realized by a secondary storage such as the hard disk. The data file is called a "document" in the present embodiment.

A scanning control part 350 is a component for performing a variety of processing such as the correction, the retouching and the editing for the image data inputted from the scanner.

A print control part 330 converts the image data in the page memory 316 into a video signal, and send it to a printer engine part 340.

The printer engine part 340 is a printing mechanism for forming a permanent visible image of the received video signal on a recording paper.

<Data Processing of Controller Unit>

Then, it will be described how the vector data, the DL (Display List) and the metadata, that constitute a document, are generated.

Figure 4:
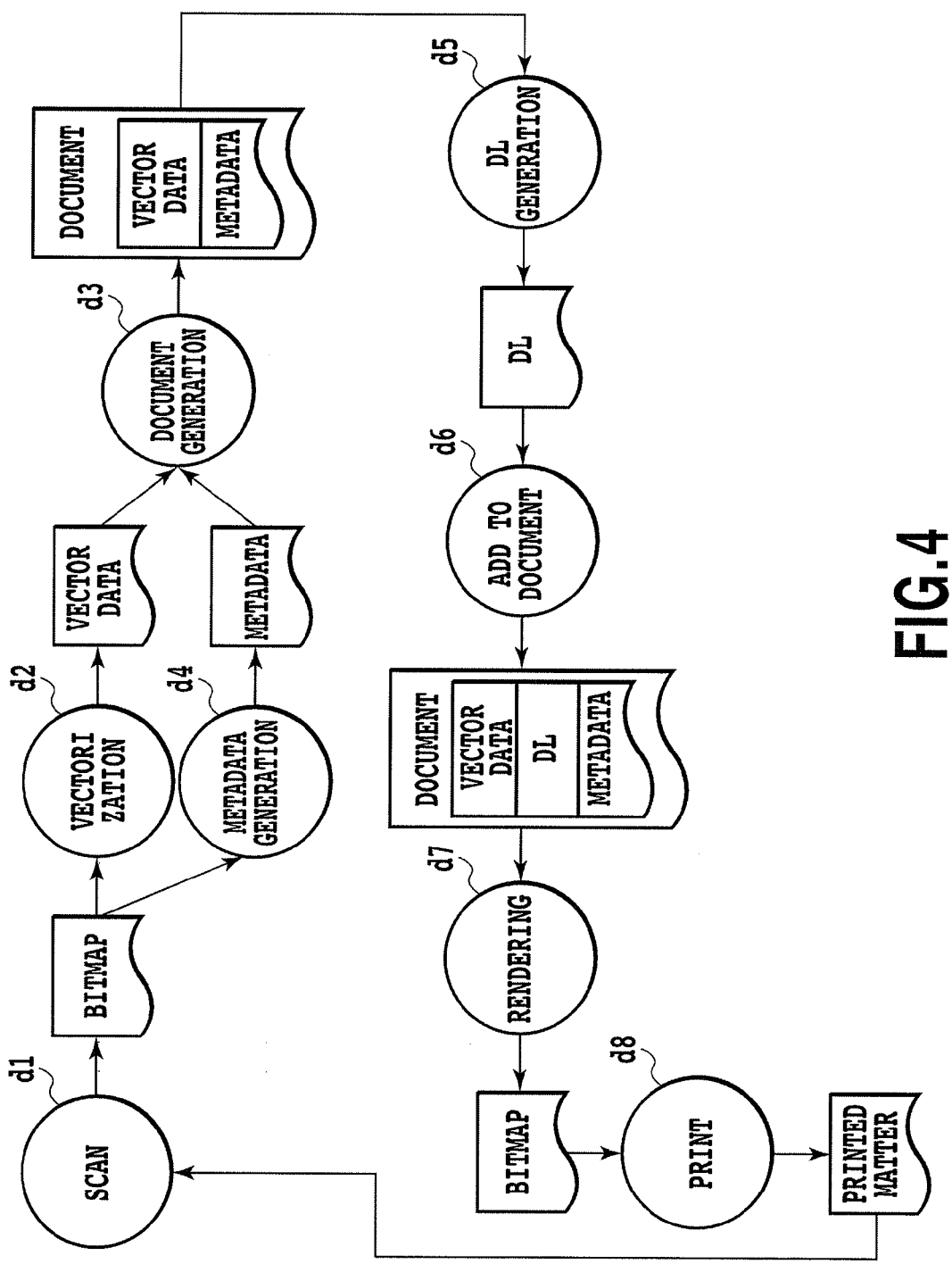
FIG. 4 illustrates a data flow at the time of a copying operation in the embodiment.
Figure 5:
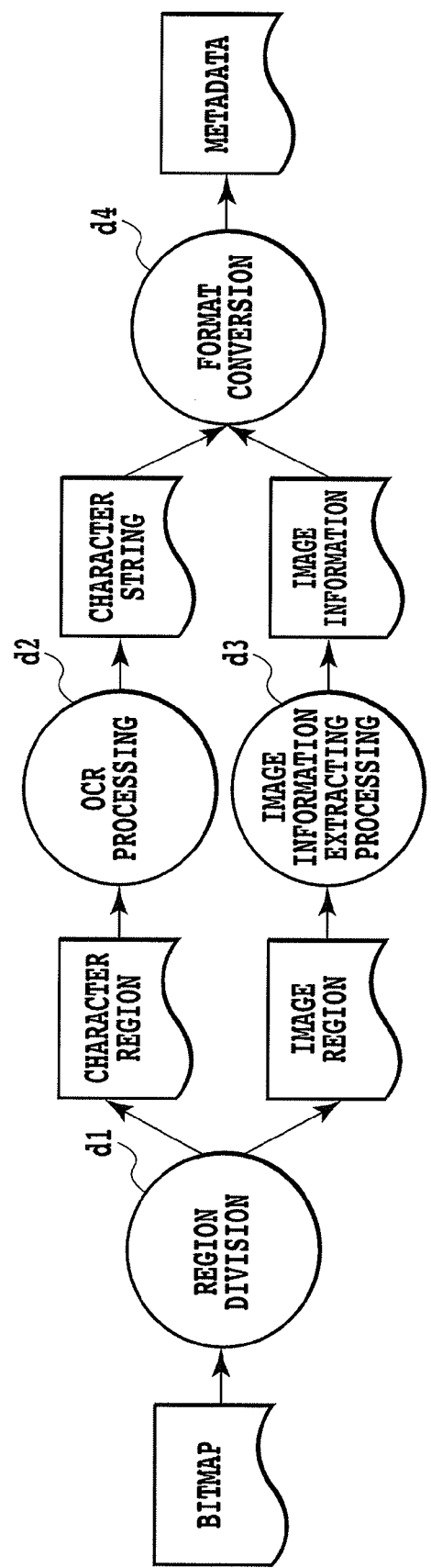
FIG. 5 illustrates a data flow of metadata generation processing in the embodiment.
Figure 6:
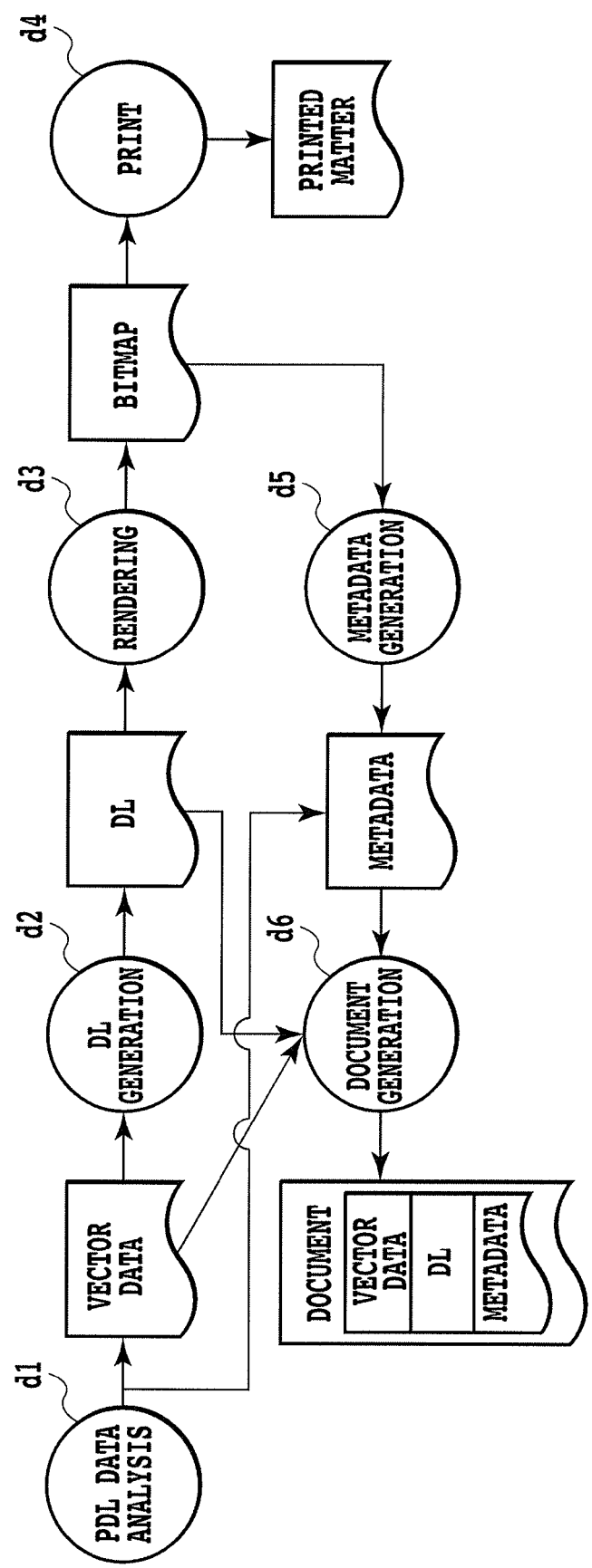
FIG. 6 illustrates a data flow at the time of PDL printing in the embodiment.

FIG. 4, FIG. 5 and FIG. 6 illustrate data flows in the control unit in the present embodiment.

FIG. 4 shows a data flow at the time of copying operation.

As illustrated in FIG. 4, a paper manuscript set in the scanner section is converted by a scanning processing d1 into the bitmap data first.

Then, by a vectorization processing d2 and a metadata generation processing d4, the vector data independent on the resolution and the metadata accompanying the vector data are generated from the bitmap data, respectively. The specific generating method of the vector data and the metadata will be mentioned later.

Then, a document in which the vector data and the metadata are associated to each other is generated by a document generation processing d3.

Then, the DL is generated from the vector data in the document by a DL generation processing d5, and the generated DL is stored in the document, and is sent to a rendering processing d7 to be developed into the bitmap.

The developed bitmap is recorded on a paper medium by a print processing d8 to become a printed matter. If the outputted printed matter is set again in the scanner section, the processing from the scanning processing d1 can be performed.

FIG. 5 illustrates a specific data flow of the metadata generation processing d4 illustrated in FIG. 4.

As illustrated in FIG. 5, region division is performed from the bitmap by a region division processing d1 first. The region division is processing where the inputted bitmap image data is analyzed to be divided into regions for every group of objects included in the image, and where an attribute of each region is determined to be categorized. As the attributes, there are categories such as a character (TEXT), an image (PHOTO), a line (LINE), a figure (PICTURE) and a table (TABLE).

Figure 7:
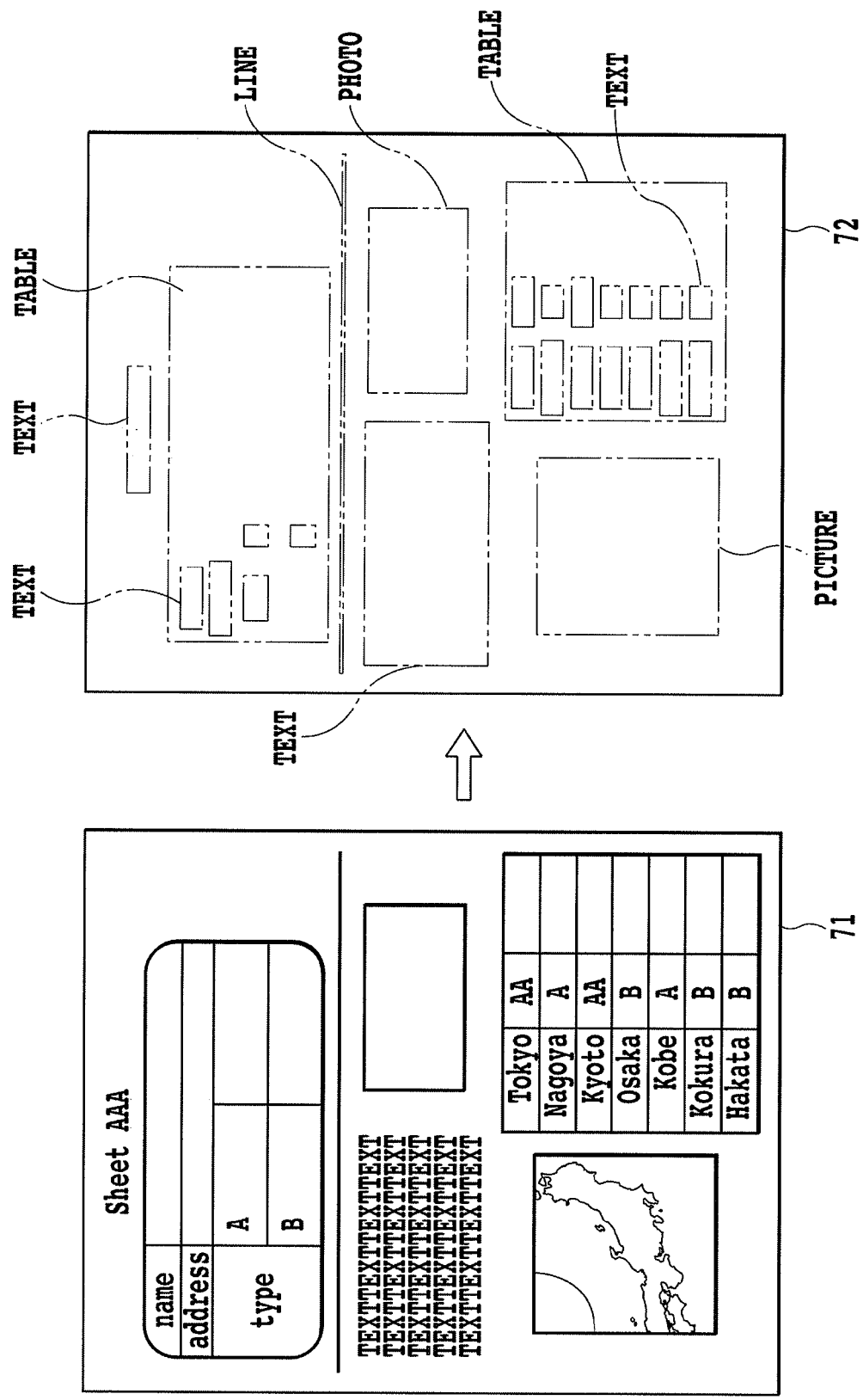
FIG. 7 illustrates an example in the case of performing region division for an inputted image in the embodiment.

In FIG. 7, illustrated is an example in which the region division for the inputted image is performed.

A result of the region division performed for an inputted image 71 is a determination result 72. In the determination result 72, a portion enclosed with a dotted line indicates one unit of the object resulting from the analysis of the image, and a layout of each object is illustrated understandably. The category name of the attribute given to each object is the determination result of the attribute of each object based on the region division.

From among the regions categorized for every attribute, an region of the character attribute is character-recognition-processed by an OCR processing d2 to be converted into a character string. That is, the character string is the one printed on a paper.

On the other hand, from among the regions categorized for every attribute, a region of the image attribute is converted into the image information via an image information extracting processing d3. The image information is the character string indicative of a feature of the image, and is the character string such as a "flower" and a "face", for example. For the extraction of the image information, it is possible to use detection of an image feature amount such as a frequency and density of a pixel that constitutes the image, and general image processing technology such as face recognition. The region division information mentioned above can be acquired by the region division processing.

The character string and image information generated as mentioned above are arranged into a data format mentioned later as additional information by a format conversion processing d4 to generate the metadata. The information regarding the object itself is included in the vector data as mentioned later.

FIG. 6 shows a data flow at the time of a PDL (Page Description Language) printing.

The PDL printing is a printer operation that receives the page description language (PDL) code generated by a printer driver on a PC and performs the output thereof when application software on the PC (Personal Computer) instructs the printing.

As illustrated in FIG. 6, the received PDL code is analyzed by a PDL data analysis processing d1 first, and the vector data is generated.

Then, the DL is generated by a DL generation processing d2 from the vector data, and the generated DL is stored in the document and sent to a rendering processing d3 to be developed into the bitmap. The developed bitmap is recorded on the paper medium to become the printed matter by a print processing d4.

The vector data and the DL generated in this process are stored in the document by a document generation processing d6.

Furthermore, from the bitmap generated by the rendering processing d3, the character string and image information are generated as the metadata like the copying operation and stored in the document by the metadata generation processing d5 described in FIG. 5.

As for the PDL, there exist various categories such as LIPS (LBP Image Processing System) and PS (PostScript), and some PDLs have the character string information. In this case, the metadata is generated from the character string at the time of the PDL analysis, and stored in the document.

<Document Generation Processing and Print Processing from Image>

Then, document generation processing and print processing from an image will be described with reference to a flow chart of FIG. 8.

Figure 8:
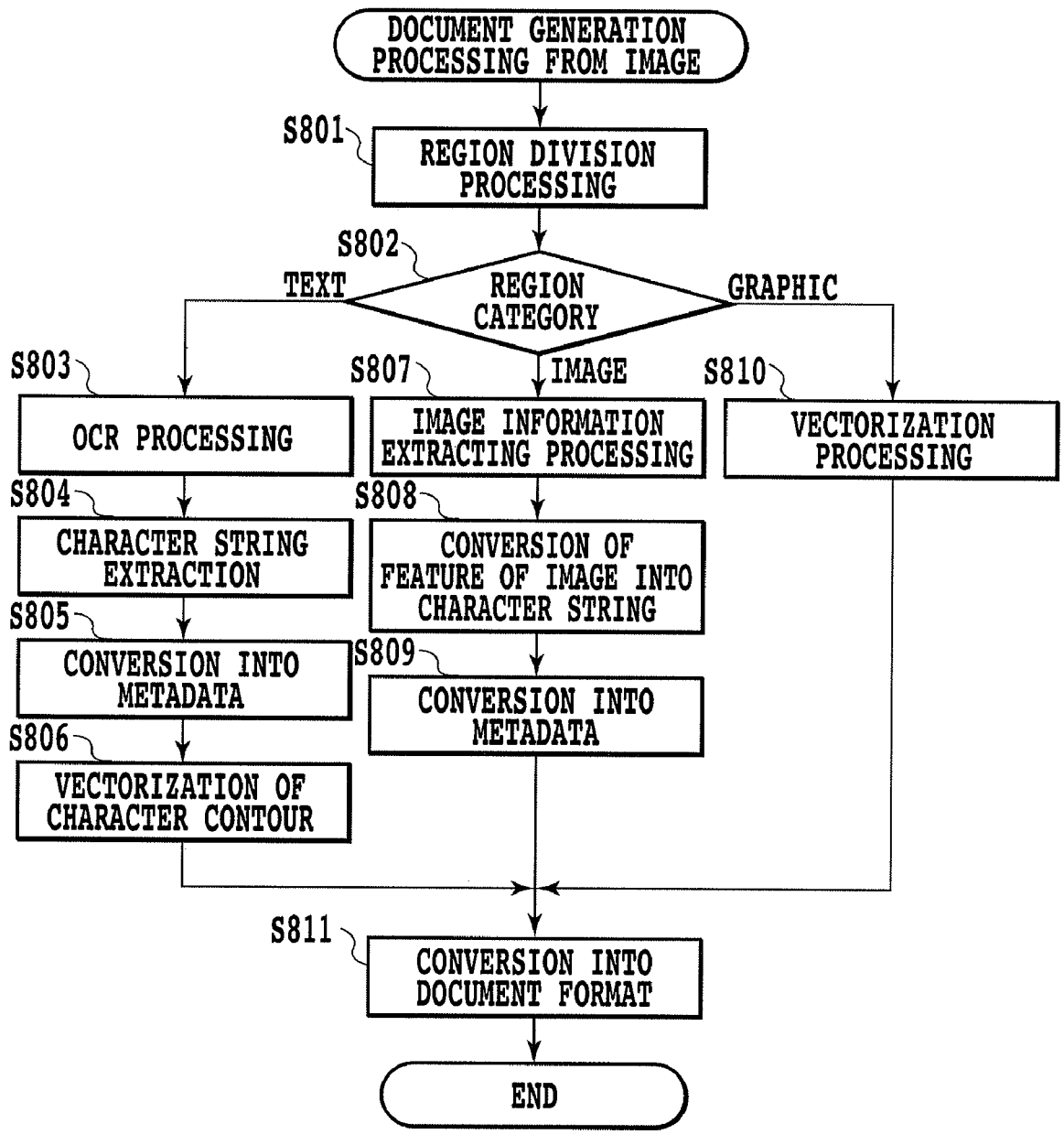
FIG. 8 illustrates a data flow of document generation processing from an image in the embodiment.

FIG. 8 illustrates the document generation processing. The document generation processing is the processing that generates, with the bitmap data (image) received, a document including the vector data, the DL, and the metadata.

First, the region division processing mentioned above in step S801 is performed.

Then, in step S802, classes (attributes) of regions are categorized into a TEXT, a GRAPHIC, and an IMAGE, and a separate processing is performed for each.

Although an example in which the attributes are categorized into TEXT, PHOTO, LINE, PICTURE, and TABLE is illustrated in FIG. 7, PHOTO and PICTURE of the attributes illustrated in FIG. 7 are categorized as IMAGE, and LINE and TABLE are categorized as GRAPHIC.

When the region attribute is TEXT, after the step progresses to step S803 and an OCR processing is performed, the character string is extracted in step S804. After that, the character string is converted into the metadata in step S805, and the step progresses to step S806, and the recognized character contour is converted into the vector data.

Here, a little more description will be added.

The metadata generated from the character string is an enumeration of the character code that is necessary information for a keyword retrieving.

However, even if the OCR processing can recognize the character code, it is impossible to recognize up to font types such as "Mincho" and "Gothic", font sizes such as "10 pt" and "12 pt", and font attributes such as "Italic" and "Bold". Therefore, for the drawing, the character contour is needed to be held as the vector data without the character code being used.

On the other hand, when the region attribute is IMAGE in the determination of the region category in step S802, the step progresses to step S807 and the image information extracting processing is performed.

At step S807, as mentioned above, the feature of the image is detected using the general image processing technology such as the image feature amount detection and the face recognition.

Then, the step progresses to step S808 and the detected feature of the image is converted into the character string. This conversion is easy if a table of the feature parameters and character strings has been held.

After that, in step S809, the above-mentioned character string is converted into the metadata. For the region attribute of IMAGE, the vectorizing of the image data is not performed, and the image data is held in the vector data as it is.

When the region attribute is GRAPHIC in step S802, the step progresses to step S810 and the vectorization processing is performed.

Subsequently, a document printing processing will be described with reference to FIG. 9.

Figure 9:
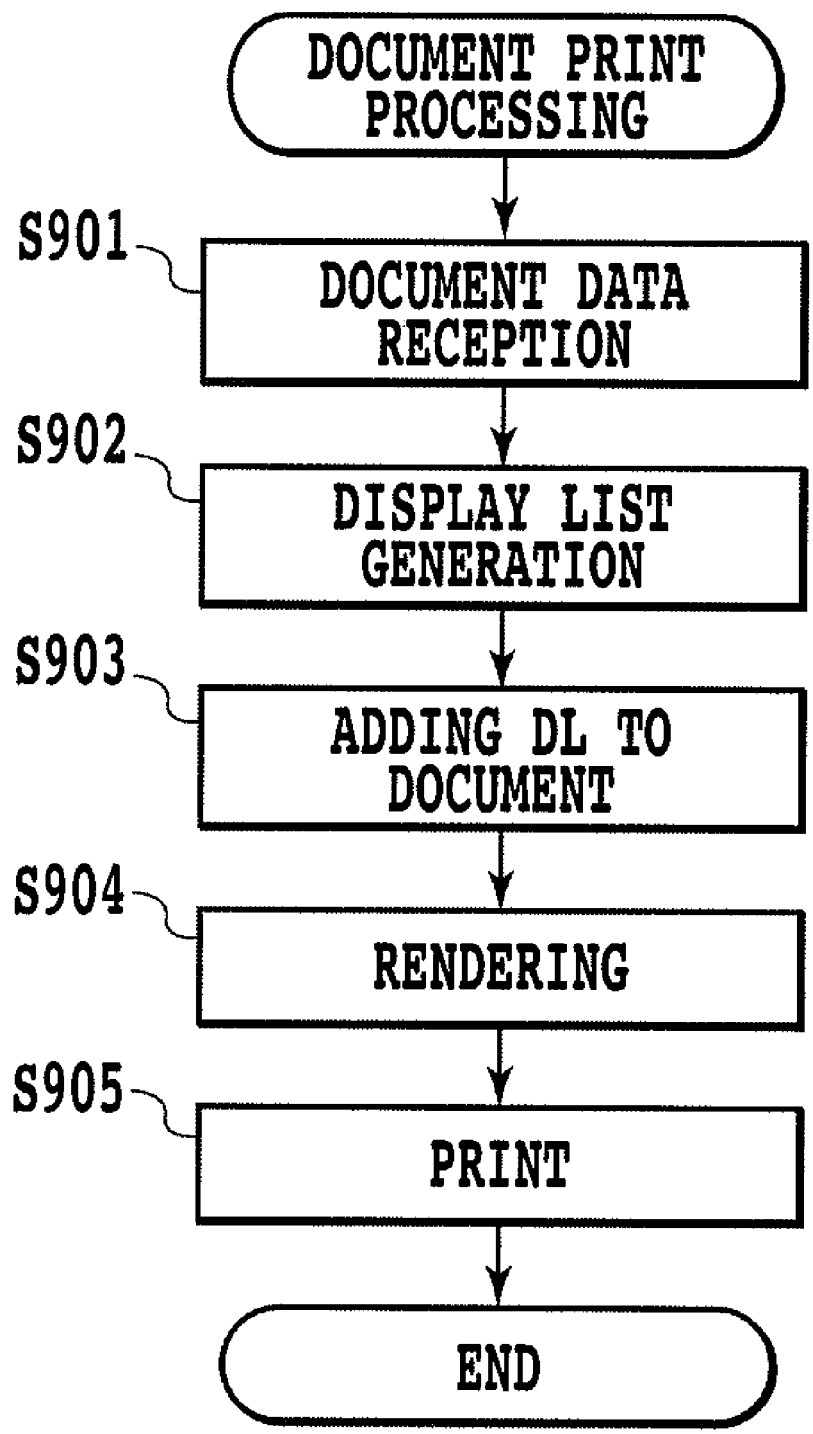
FIG. 9 illustrates a data flow of document printing processing in the embodiment.

FIG. 9 illustrates the document printing processing. This processing performs the printout of the generated document.

First, in step S901, document data is received and the DL is generated from the vector data within the document in step S902.

Then, in step S903, the generated DL is added to the document and the rendering of the DL to the bitmap is performed at step S904.

The processing will be completed after the print processing for the paper medium is finally performed in step S905.

<Document Generation and Print Processing from PDL Code>

Then, the document generation processing and print processing from the PDL code will be described with reference to FIG. 10.

Figure 10:
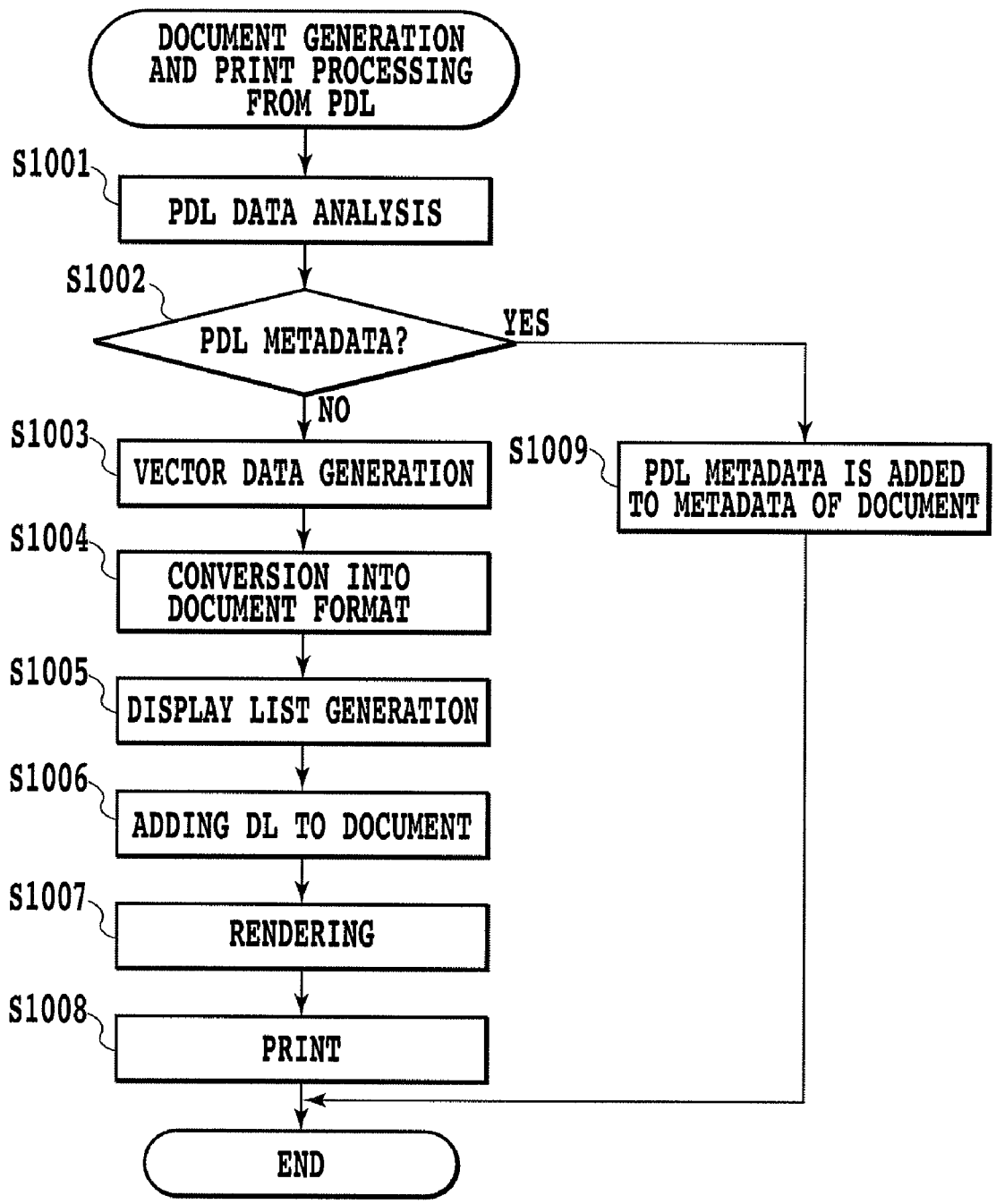
FIG. 10 illustrates a data flow of document generation and print processing from a PDL in the embodiment.

FIG. 10 illustrates the document generation and the print processing from the PDL code. This processing is the processing that receives the PDL code to generate the document and performs the printout thereof.

First, the PDL code is analyzed in step S1001. Then, in the analysis, if the metadata such as the character string information is included in the PDL code, the step progresses to step S1009, and the information included in the PDL code is added to the metadata.

On the other hand, the data other than the metadata such as the character string information in step S1002 is converted into the vector data after the step progressing to step S1003. After that, while the step progresses to step S1004, the vector data is converted into the document format and the document is generated.

Then, the DL is generated in step S1005, and after the step progressing to step S1006, the generated DL is added to the document.

The document is generated by the flow so far, and after that, performing the rendering processing for the DL in step S1007 and performing the print processing on the paper medium in step S1008 will complete all of the processing.

<Document Data Structure>

Then, the structure of the document will be described with reference to FIGS. 11 to 13.

Figure 11:
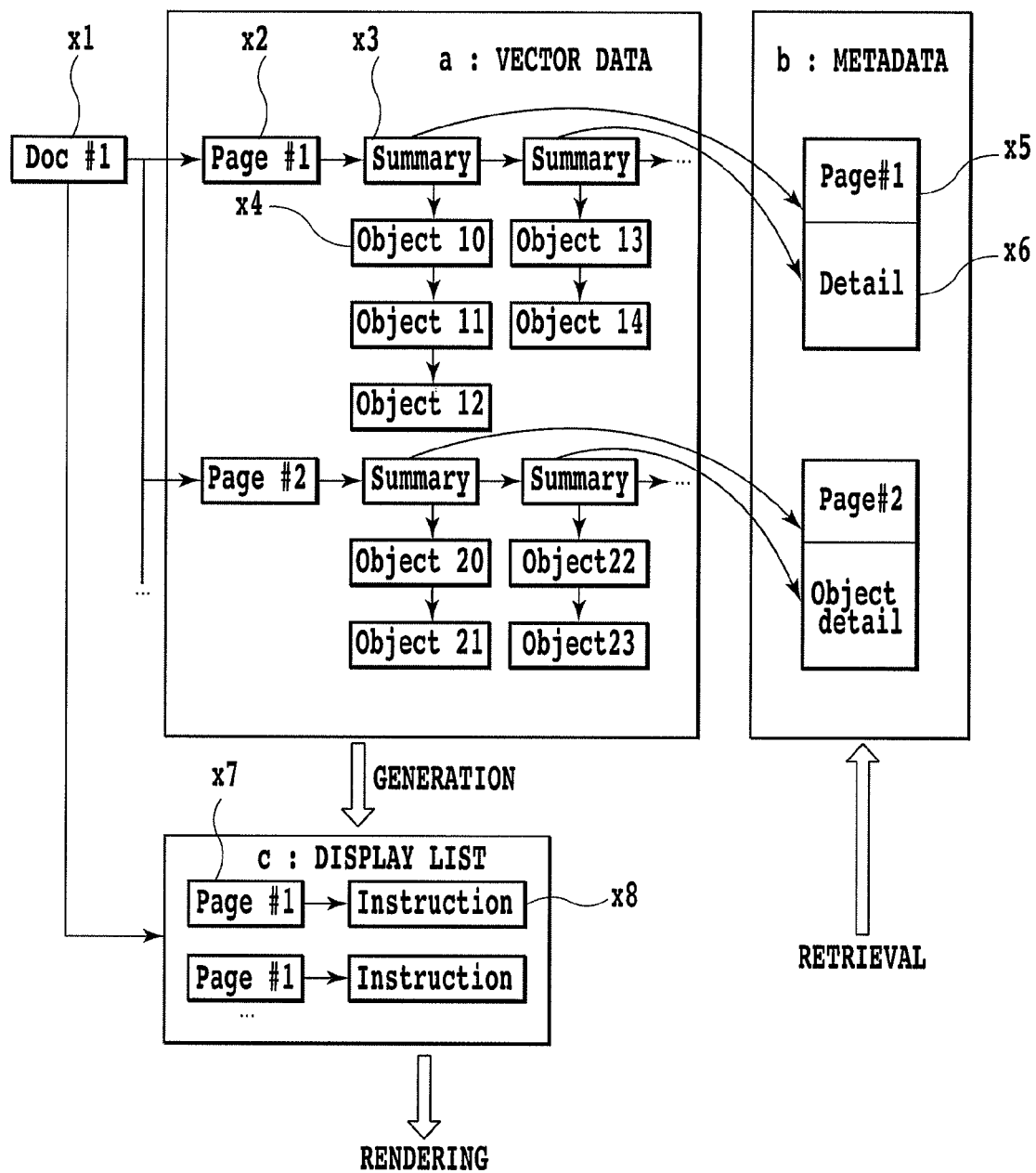
FIG. 11 illustrates a data structure of a document in the embodiment.

FIG. 11 illustrates the data structure of the document.

As illustrated in FIG. 11, the document is the data having two or more pages, and includes, if categorized largely, the vector data (a), the metadata (b), and the DL (c), and has a hierarchical structure with a document header (x1) as the top.

The vector data (a) is further made up of a page header (x2), summary information (x3), and an object (x4). The metadata (b) is further made up of page information (x5) and detailed information (x6). The DL (c) is further made up of a page header (x7) and an instruction (x8) for drawing development. Since the storing position of the vector data and the storing position of the DL are stated in the document header (x1), the vector data and the DL are associated by the document header (x1).

Since the vector data (a) are resolution independent drawing data, layout information such as a size and direction of the page is stated in the page header (x2). To the object (x4), every one drawing data such as a line, a polygon, and a Bezier curve, is linked one by one, and a plurality of objects is associated collectively with the summary information (x3). The summary information (x3) expresses the feature of a plurality of objects collectively, and describes attribute information or the like of the division region described in FIG. 7.

The metadata (b) is the additional information that is not related to the drawing processing. In the page information (x5) region, included is the page information such as whether the metadata is one that has been generated from the bitmap data or one that has been generated from the PDL code, for example.

In the detailed information (x6), the character string (character code string) generated as OCR information or the image information is stated.

The metadata is referred to from the summary information (x3) of the vector data (a), and the detailed information (x6) can be found from the summary information (x3).

The DL (c) is the intermediate code for the renderer to perform bitmap development. In the page header (x7), a management table of drawing information (instruction) in the page, or the like, is stated, and the instruction (x8) is made up of resolution dependent drawing data.

Subsequently, how the data structure described in FIG. 11 is arranged on a memory and a file will be described with reference to FIGS. 12A and 12B.

Figures 12A, 12B:
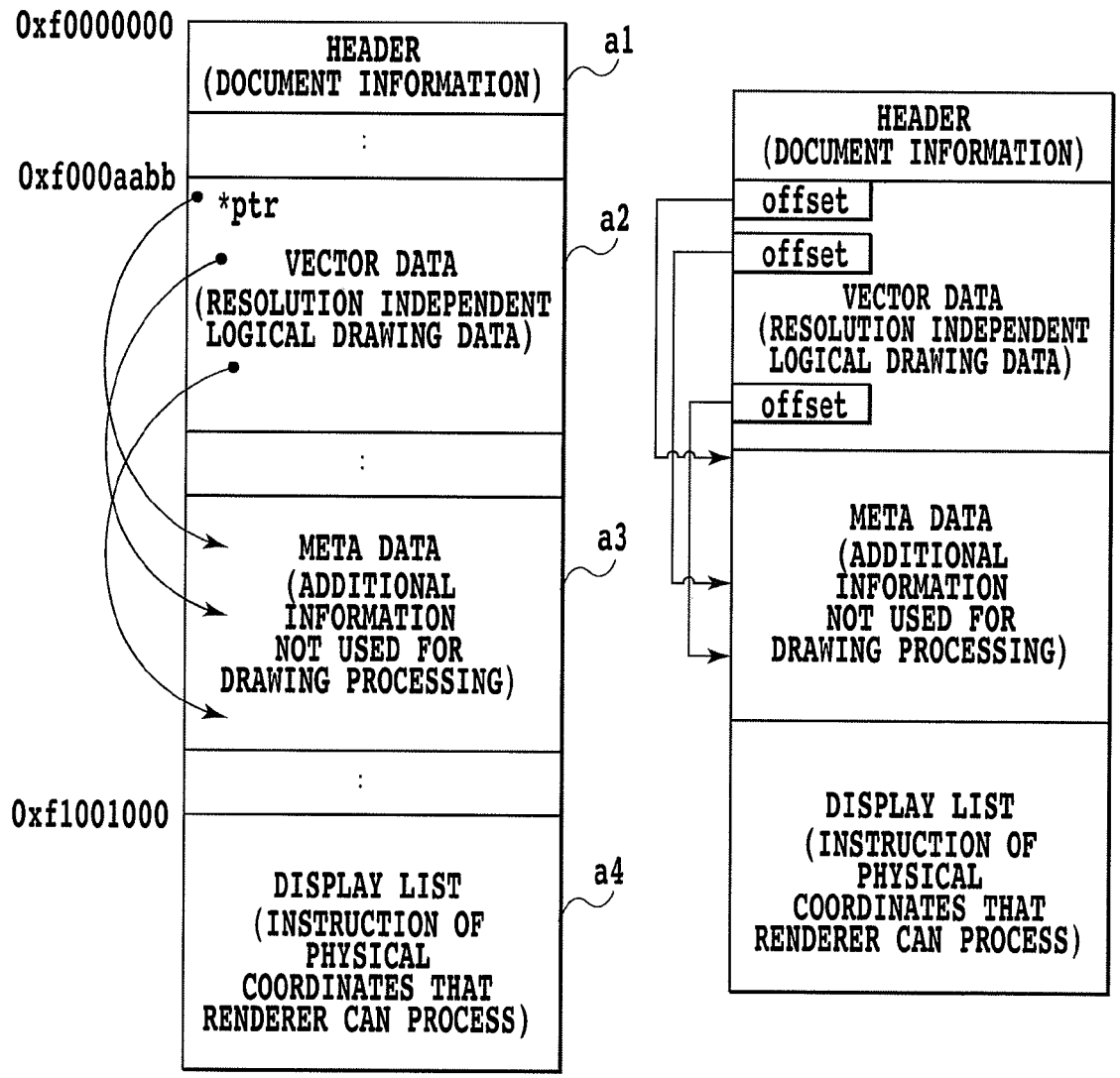
FIGS. 12A and 12B illustrate how the data structure described in FIG. 11 is arranged on a memory and file.

FIGS. 12A and 128 illustrate how the data structure described in FIG. 11 are arranged on the memory and the file.

As illustrated in FIG. 12A, as for the document, the vector-data region, the metadata region and the DL region are arranged in the arbitrary addresses on the memory.

As illustrated in FIG. 12B, as for the document, the vector-data region, the metadata region and the DL region are serialized in one file.

Subsequently, a specific example of document data will be described with reference to FIG. 13.

Figure 13:
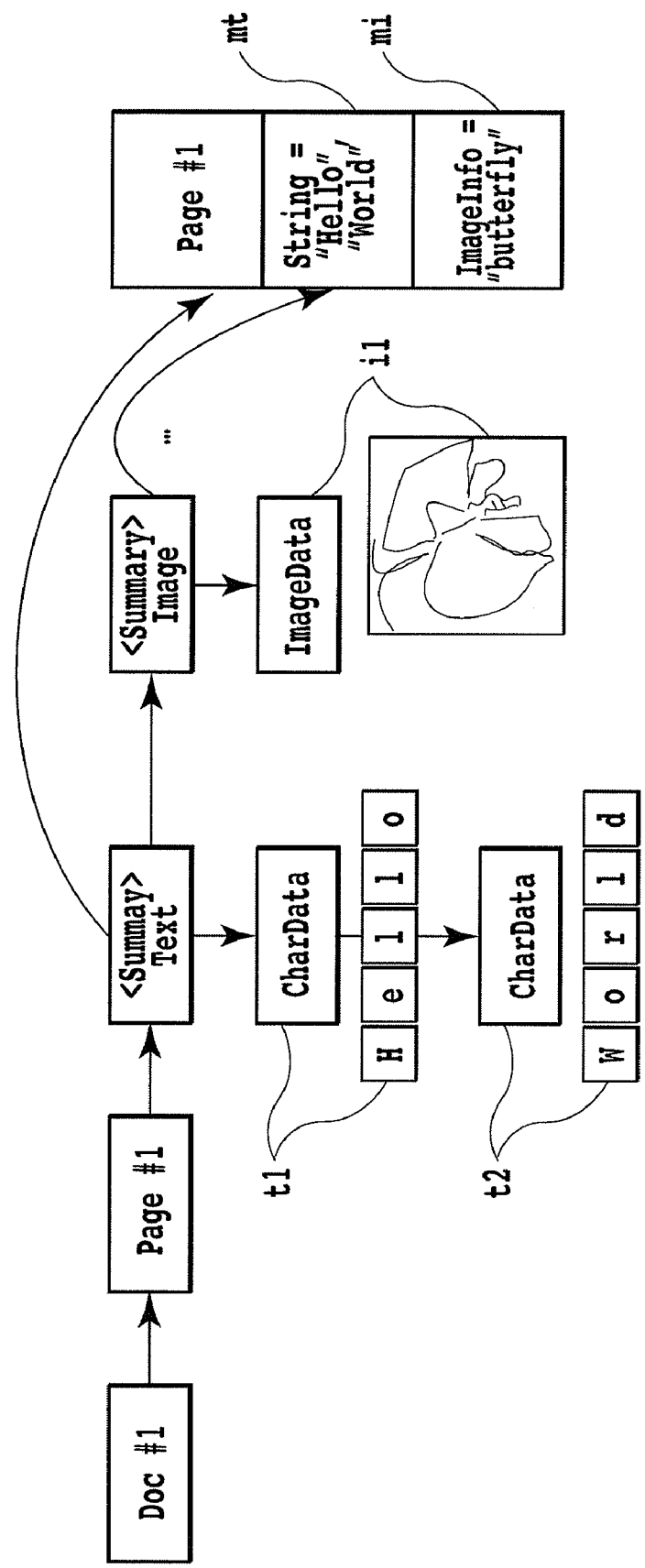
FIG. 13 illustrates a specific example of document data in the embodiment.

FIG. 13 shows the specific example of the document data.

The document data has the attribute information "TEXT" and "IMAGE" in the summary information of the first page. To the summary information of "TEXT", the character contours of H, e, l, l, o (object t1), and W, o, r, l, d (object t2) are linked as the vector data.

Furthermore from the summary information, the character code strings (metadata mt) "Hello" and "World" are referred to.

To the summary information of "IMAGE", a photographic image (JPEG data) of a butterfly is linked. Furthermore from the summary information, the image information (metadata mi) "butterfly" is referred to.

Therefore, in the case of retrieving a text within the page by the keyword "World", for example, the retrieval may be performed by the following procedures.

First, the vector data is sequentially acquired from the document header. Then, the metadata linked to "TEXT" may be retrieved from the summary information linked to the page header.

<Preview Processing>

Then, preview processing in the present embodiment will be described with reference to FIGS. 14 to 16.

Figure 14:
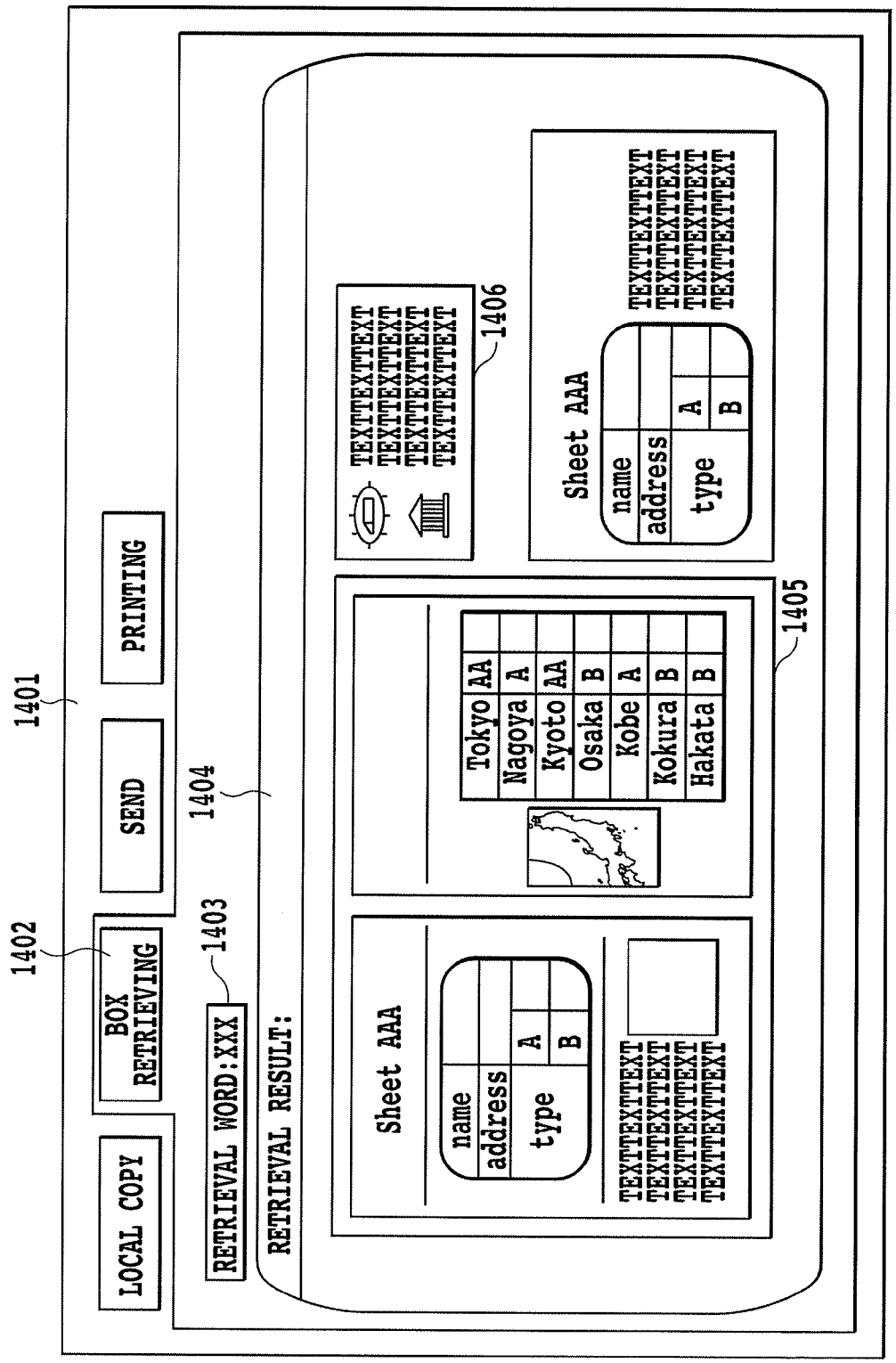
FIG. 14 illustrates an example of a screen displayed on an operation part in the embodiment.
Figure 15:
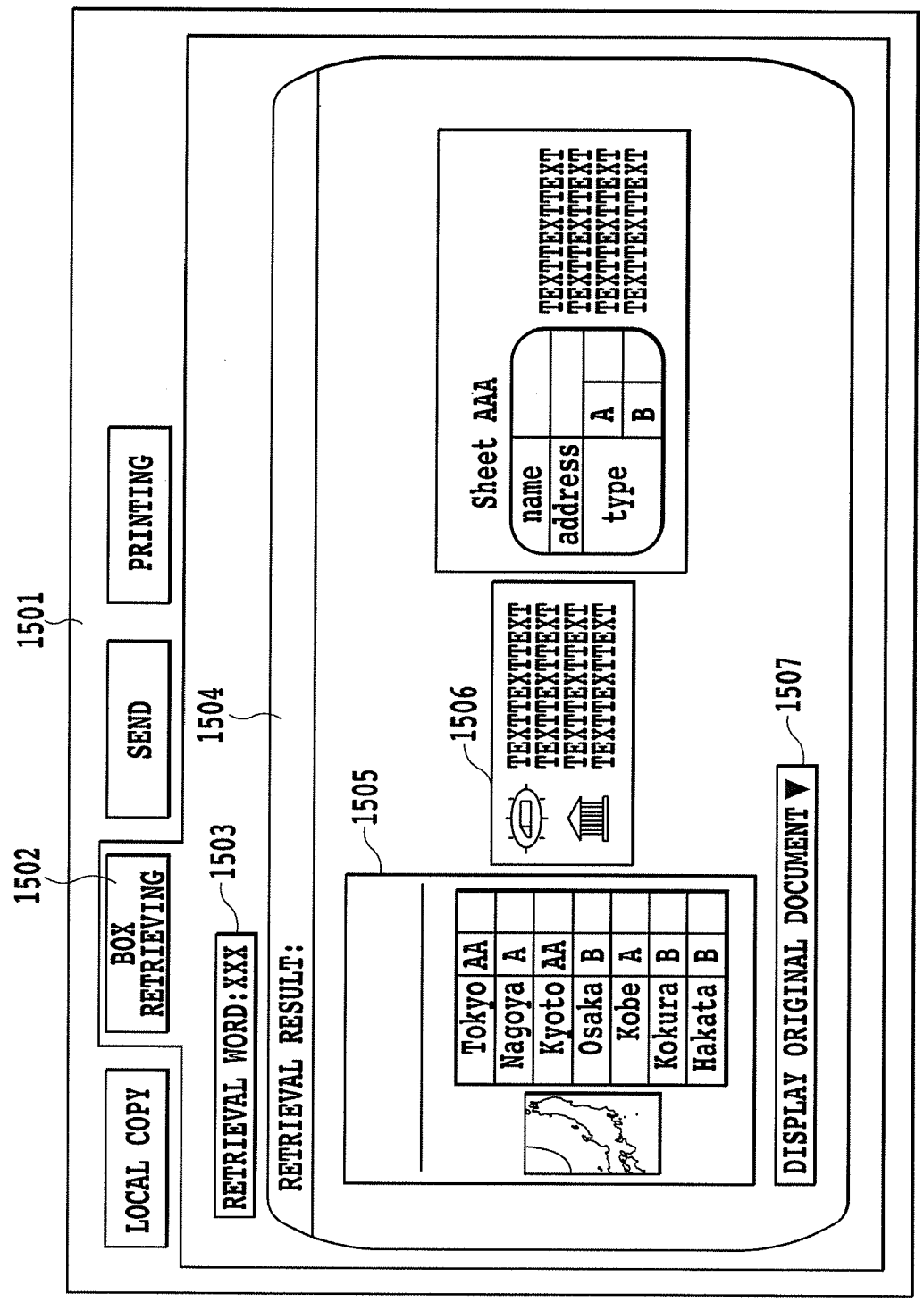
FIG. 15 illustrates an example of a screen displayed on the operation part in the embodiment.
Figure 16:
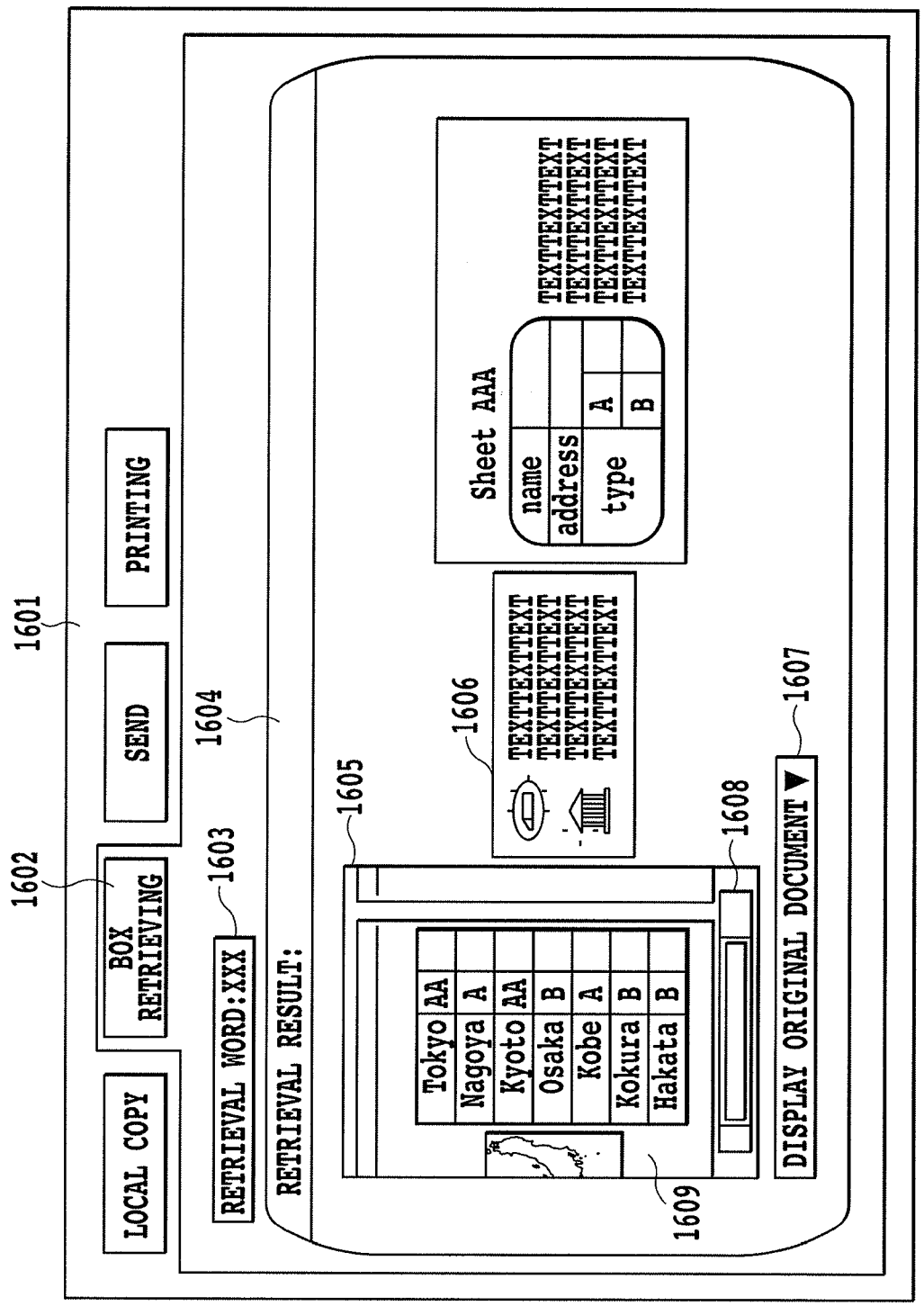
FIG. 16 illustrates an example of a screen displayed on the operation part in the embodiment.

FIGS. 14 to 16 illustrate examples of screens of the operation part in the case of performing the preview.

The preview processing is the processing that stores, in a box, the document inputted into the MFP by the PDL or the scanning and after that, displays the thumbnails thereof on the operation part in the case of viewing the box, for example. By appending the metadata to the object of the document in the box, inputting a retrieval word enables the object having the metadata corresponding to the word to be detected. Thereby, by inputting the text concerning the subject to be searched for, the user can detect the object of the corresponding image.

FIG. 14 shows an example of a screen of the operation part in case of the user performing the preview. Reference numeral 1401 of FIG. 14 is a screen displayed on the operation part for the preview to be performed, and is displayed when the user pushes a box retrieving button 1402.

When the user inputs the retrieval word into the field 1403, the document including the object corresponding to the retrieval word is displayed on the region 1404. Here, reference numeral 1405 is a 2-up document and reference numeral 1406 is a 1-up document.

Subsequently, FIG. 15 is an example of a screen of the operation part in the case of the user performing "automatic 1-up preview" setting in advance.

Reference numeral 1501 of FIG. 15 is the screen displayed on the operation part for the preview to be performed as in the case of FIG. 14. The screen is displayed when the user pushes a box retrieving button 1502.

When the user inputs a retrieval word into the field 1503, the document including the object corresponding to the retrieval word is displayed on the region 1504. In the preview processing in the present embodiment, in the case of the user performing "automatic 1-up preview" setting in advance, the document is displayed like reference numeral 1504. Against the N-up document like the reference numeral 1405 of FIG. 14, only the page including the object detected by the retrieval like reference numeral 1505 is displayed like the 1-up document. In the present description, it is expressed figuratively as "N-upped" or "of N-up" or "N-up . . . " that the manuscript contents (image) corresponding to N pages are laid out (synthesized) in the document of one page. An N-upped document shall be called an "N-up document" or a "document of N-up."

On the other hand, in the case of the user desiring to perform the display in the state of the original N-up, when the user pushes the "Display Original Document" button 1507, the N-up display like the reference numeral 1405 of FIG. 14 of the original will be performed. The document of 1-up originally like reference numeral 1506 is displayed in the similar manner as in FIG. 14.

Subsequently, the case that the object detected at the time of the retrieval corresponds to two pages or more in the same page of the N-up document will be described using FIG. 16.

Reference numeral 1601 is a screen displayed on the operation part for the preview to be performed, which is the same as what is illustrated in FIG. 14, and the screen is displayed when the user pushes the box retrieving button 1602.

When the user inputs a retrieval word into the field 1603, documents including the object corresponding to the retrieval word are displayed in a region 1604. Here, in the case that the corresponding objects exist in two pages or more in the same page of the N-up document, the display like reference numeral 1605 is performed. Reference numeral 1608 is a scroll bar, and by operating the scroll button right and left, the display contents of reference numeral 1609 moves right and left, and the scroll display of the corresponding pages as the 1-up document becomes possible. As a matter of course, it may be made to perform the scroll display of all the pages laid out to the N-up document. By pushing down the "Display Original Document" button 1607, it is also possible to view the original N-upped state. The document that is originally 1-up like reference numeral 1606 is displayed in the same manner as in FIG. 14.

<Document Generation Processing at Scanning of Paper Document>

Then, the document generation processing in scanning a paper document will be described using a flow chart of FIGS. 17A and 17B.

Figure 17A:
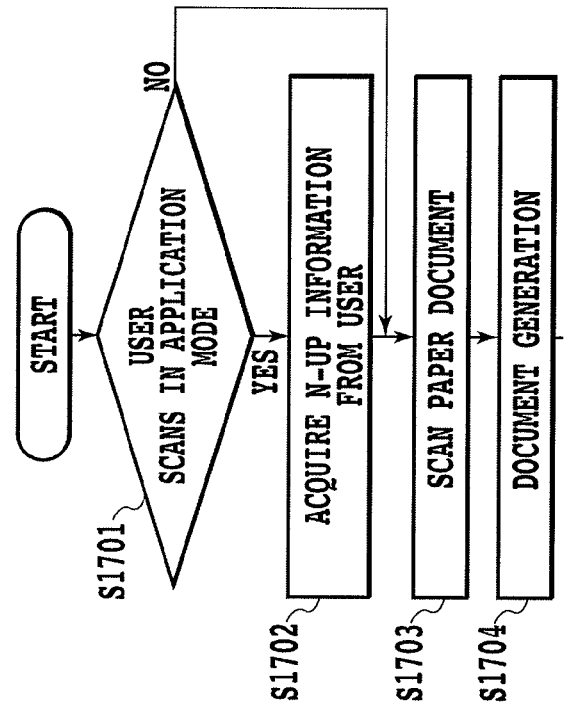
FIGS. 17A and 17B are a flow chart describing document generation processing at the time of scanning in the embodiment.
Figure 17B:
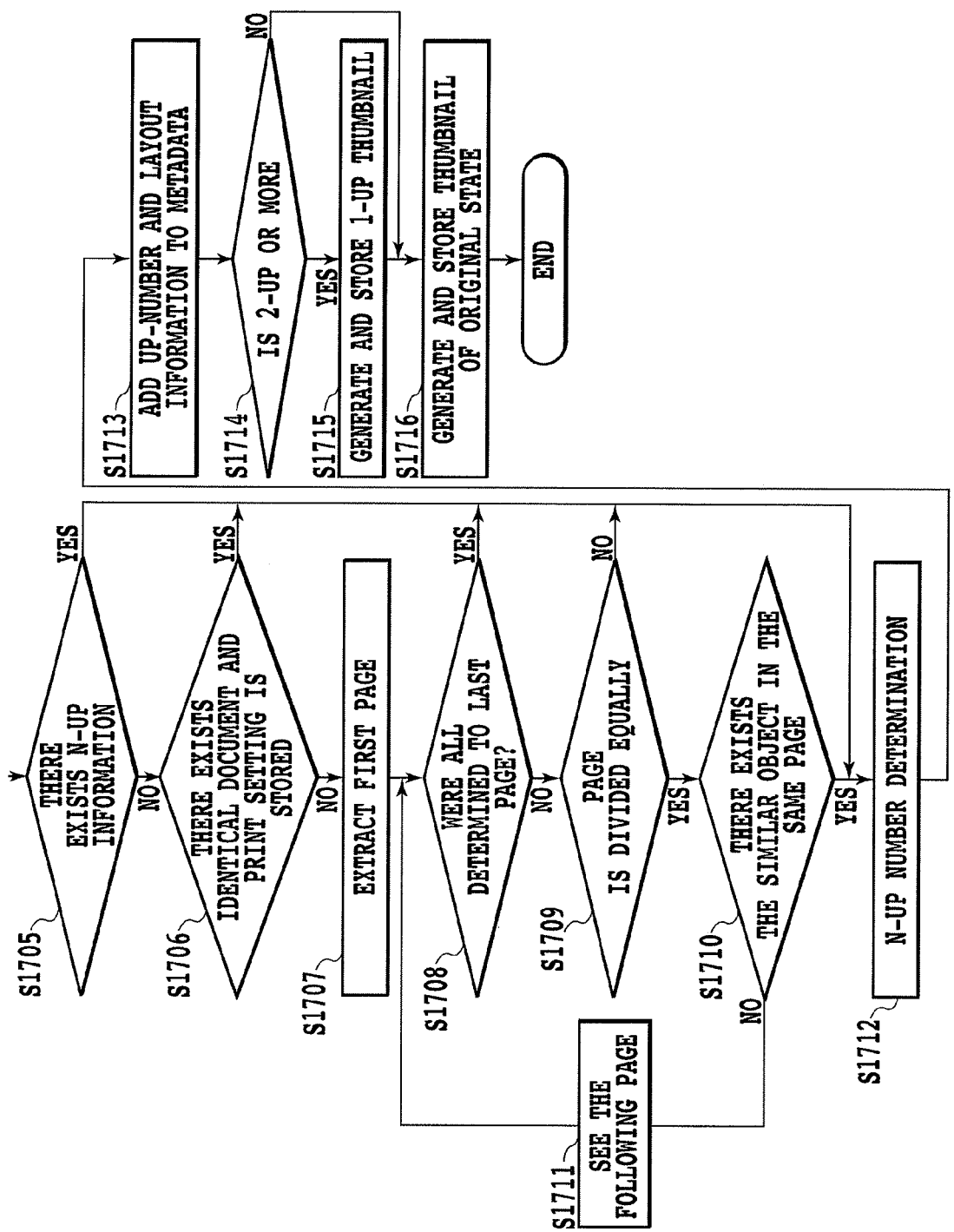

FIGS. 17A and 17B illustrate the document generation processing in scanning the paper document. This processing performs an N-up determination whether this paper document is an N-up document (determination whether or not the document is an N-up document) from the image data acquired by scanning the paper document. When the paper document is determined to be the N-up document, this processing generates the document (data file) to which added is N-up information (an N-up number, that is, N (>=2), and the region division information) that is layout print information.

First, in step S1701, the user inputs the N-up information by selecting an application mode. The N-up information inputted by this application mode is stored in the memory of the device in step S1702.

Then, the paper document (manuscript) is scanned in step S1703, and the document having the vector data, metadata and display list described using FIG. 11 is generated in step S1704.

Then, in step S1705, when the N-up information is available such as in the case that the user inputs the N-up information by the application mode at the time of the scanning, or the like, the step progresses to step S1713. When the N-up information is not available, the step progresses to step S1706.

Then, in step S1706, from the information stored in the metadata of the document generated at step S1704, it is retrieved whether or not the same document is stored in a device hard disk or in the device connected with the network. As a result, when the same document is found and the N-up information is stored, the step progresses to step S1713. On the other hand, when the N-up information is not stored, the step progresses to step S1707.

In steps S1707 to S1712, in order to acquire the N-up information, the N-up number is determined based on the information included in the document generated as illustrated in above-mentioned FIG. 11.

In step S1707, the first page of the document is extracted.

Next, in step S1708, it is determined whether a page to be determined still remains, and when the pages are all determined up to the last page, the step progresses to step S1713.

In step S1709, it is determined whether the layout of the document divided by the region division processing is equally divided. As for the equal division, since, in the N-up document, the region in the document is divided equally, it turns out that what is not divided equally is not the N-up document. When the same page is divided equally within the inside of the page, the step progresses to step S1710. On the other hand, otherwise, the step progresses to step S1713.

In step S1710, it is determined whether the similar object exists in every region divided equally in the same page. Here, it is determined that the case having the similar objects such as a page number or a frame of a figure is the N-up document. When the similar object does not exist, the page is made to advance to the next in step S1711, and the step returns to step S1708. Even in the case where the region is divided equally, when the similar object is not found, the page is made to advance to the next. If the similar objects exist in the same page, the step progresses to step S1712.

In step S1712, the N-up number is determined from the results of steps S1707 to S1711. In the N-up determination, a number of the divided regions and a number of the similar objects are made to be the N-up number. In step S1712, the N-up number is determined, and the step progresses to step S1713.

In step S1713, the N-up information including the N-up number determined in step S1712 or the N-up information acquired after the determination in step S1705 and step S1706 is stored as the metadata. When the step progresses to step S1713 from step S1708 or step S1709, the information indicating that layout printing has not been performed is stored as the N-up information.

In step S1714, when the N-up information stored in the metadata indicates 2-up or more, that is, the layout printing has been performed, the step is made progress to step S1715.

In step S1715, the thumbnail for the preview as the 1-up document illustrated in FIGS. 15 and 16 is generated from the N-up document based on the N-up number and region division information that are the N-up information stored in the metadata (a first thumbnail generation). The first thumbnail is generated by rendering the vector data into the size for the 1-up preview. Then, the step progresses to step S1716.

On the other hand, when it is determined that the layout printing has not been performed from the N-up information of the metadata in step S1714, the step progresses to step S1716.

In step S1716, the same thumbnail for the preview as the original document (N-up document) is generated (a second thumbnail generation). Then, after the document is stored in the box, the process completes.

<Preview Processing at Retrieving in Box>

Then, the preview processing in retrieving in the box will be described using a flow chart of FIG. 18.

Figure 18:
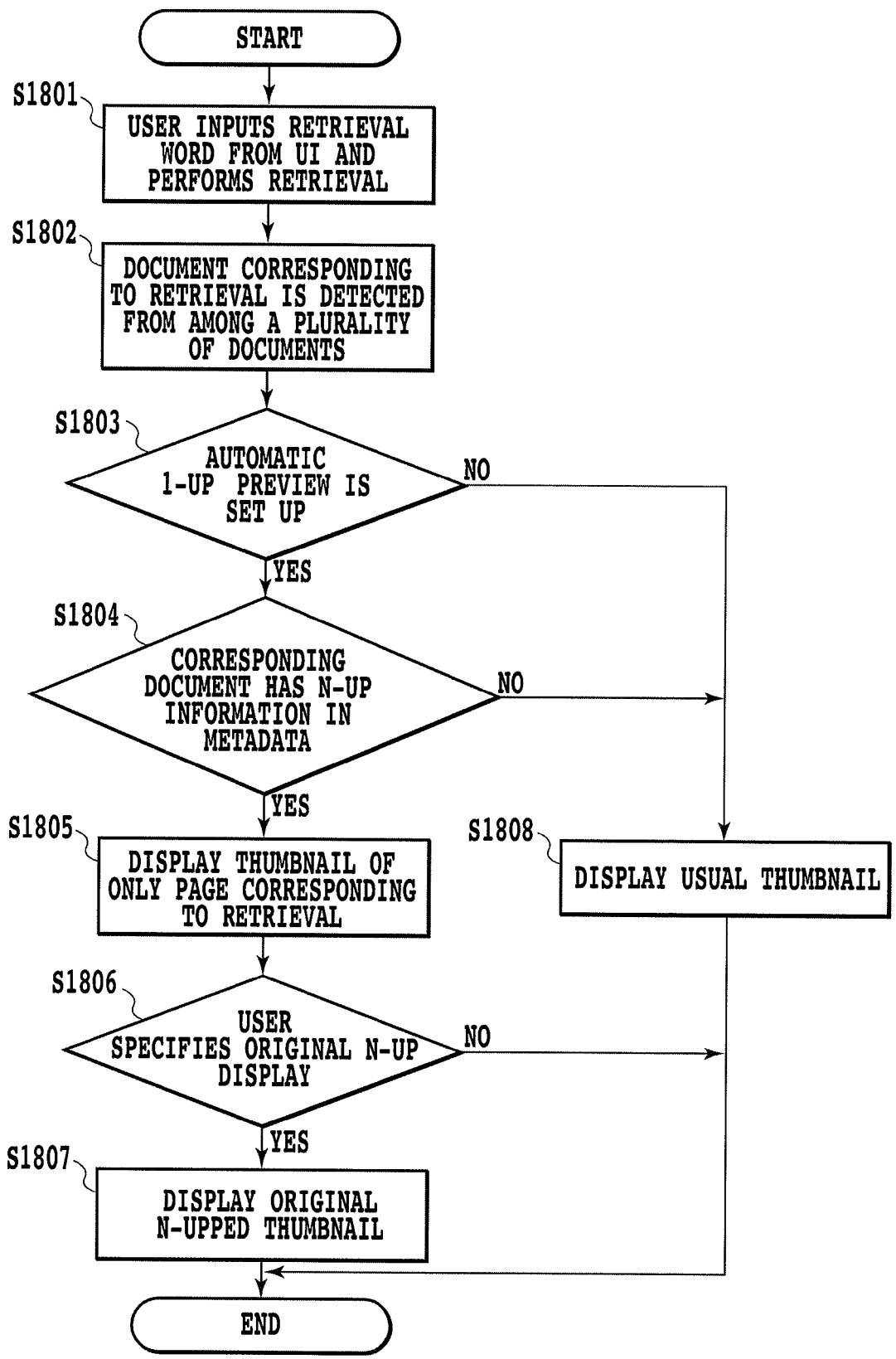
FIG. 18 is a flow chart describing preview processing at the time of retrieving in a box in the embodiment.

FIG. 18 is a flow chart describing the preview processing in retrieving in the box.

Here, supposed that the user performs the retrieval from a plurality of documents in the box.

First, the user selects a box retrieving mode from the operation part of the MFP in step S1801 and inputs a retrieval word.

In step S1802, when the user inputs "butterfly" into the operation part, for example, the object having the metadata of "butterfly" is detected. Thus, when the user performs the retrieval, the object related to the retrieval word is detected, and the document including the object is detected.

Then, the preview processing of the document including these detected objects is performed.

In step S1803, when "Automatic 1-Up Preview" is set up as a device setting, the step progresses to step S1804, and when "Automatic 1-Up Preview" is not set up, the step progresses to step S1808.

In step S1804, it is detected whether there exists the N-up information in the metadata of the document in which the detected object is included. At this time, when there exists no N-up information or the N-up number is 1-up, the step progresses to step S1808. On the other hand, when there exist the N-up information having the N-up number of 2-up or more in the metadata of the document in which the detected object is included, the step progresses to step S1805, and the thumbnail converted into the 1-up state mentioned above, which the document holds, is displayed on the preview.

Then, when the user desires to view, in the original N-up state, the document that is originally the N-up document and is displayed as the 1-up document, the processing is carried out as follows.

Here, supposed that the user specifies, from the operation part, viewing in the original N-up state for the document of which the preview display has been performed as 1-up in step S1805. In that case, the processes progress from step S1806 to step S1807, and in step S1807, the thumbnails in the original N-up state are displayed.

In step S1803, in the case that "Automatic 1-Up Preview" is not set up and in the case of the document in which there is not N-up information or the layout printing is not performed though "Automatic 1-Up Preview" is set up, the step progresses to step S1808. In step S1808, the original thumbnails are displayed.

<Print Processing of N-Up Document>

Then, the print processing of the N-up document will be described using a flow chart of FIG. 19.

Figure 19:
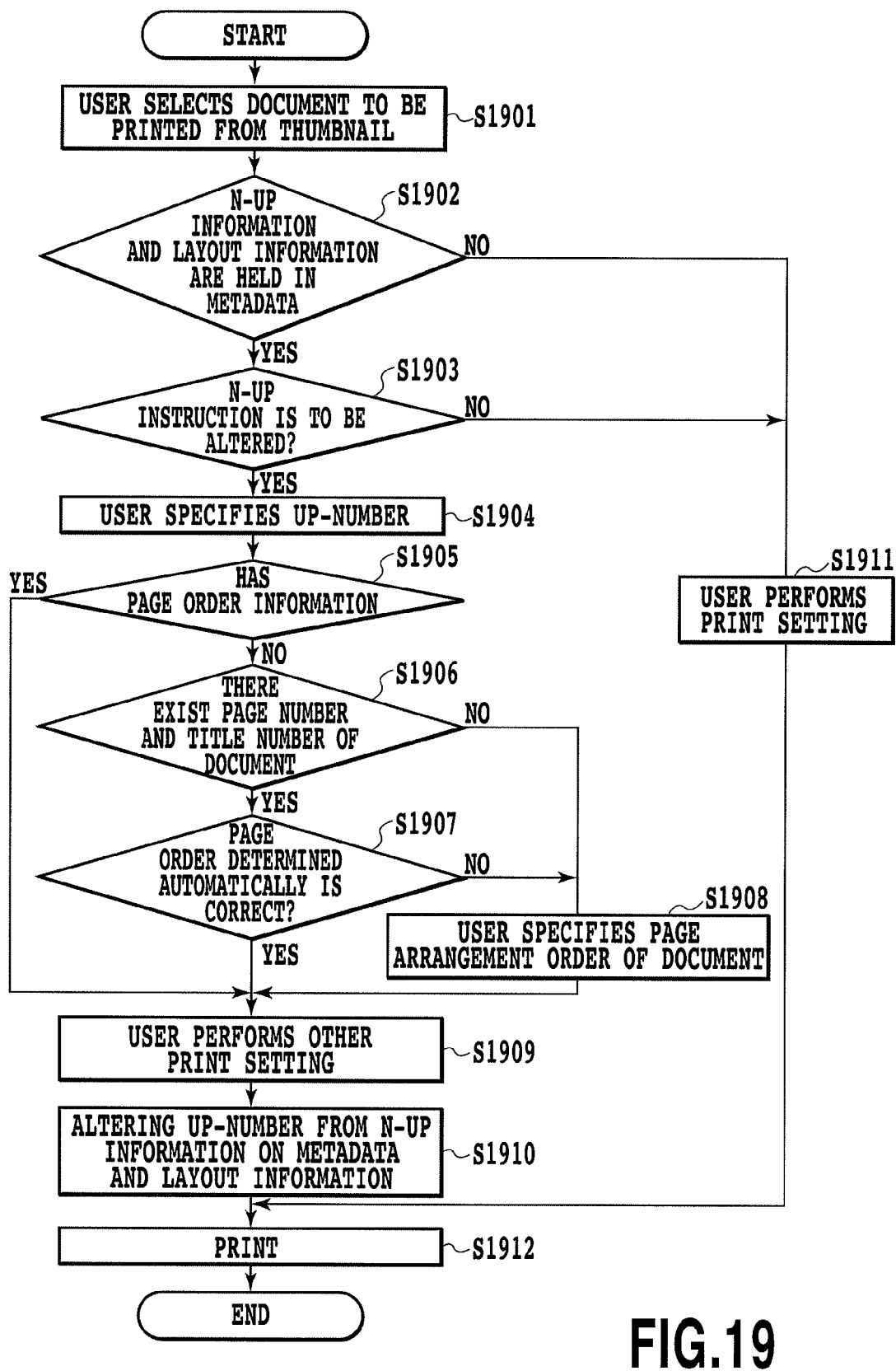
FIG. 19 is a flow chart describing print processing of an N-up document in the embodiment.

FIG. 19 is a flow chart describing the print processing of the N-up document.

First, in step S1901, the user selects the document to be printed from the thumbnails displayed on the operation part of the MFP.

In determination in step S1902, when the N-up information and the layout information are held in the metadata of the document selected in step S1901, the step progresses to step S1903, and when they are not held, the step progresses to step S1911.

Next, in step S1903, it is asked to the user from the operation part whether to alter the N-up number, and when YES is specified, the step progresses to step S1904, and when NO is specified, the step progresses to step S1911.

As for step S1911, the processing is performed for the document that is not the N-up document, or the document of which the N-up number has not been able to be discriminated. Also, the processing is performed in the case that the N-up conversion is not specified. In these cases, the original documents can be printed by the user specifying the print setting.

On the other hand, in step S1903, when the user desires to perform the printing with the N-up number altered, and specifies the alteration, the user is asked to set up the N-up number from the operation part in step S1904.

Next, in step S1905, when page order information is held in advance by the data or the like from the PDL code, the step progresses to step S1909. On the other hand, otherwise, the step progresses to step S1906.

Then, in steps S1906 to S1908, the page order for the printing is determined. When the page information is not included in the original N-up document, it is unknown whether each page included in the same page of the N-up document is printed in order of the direction of N that is the direction defined in advance or printed in order of the direction of Z, etc. Therefore, when the N-up document is converted into the 1-up document, it will have become impossible for the pages to be arranged in the primary arrangement order. Therefore, it is necessary to determine the page order of the printing in steps S1906 to S1908.

In step S1906, it is detected whether the page number exists and a title number exists in the document.

According to the number, it is determined whether the document is what has been printed in the direction of N, or what has been printed in the direction of Z. For this determination result, in step S1907, the page order of the determination result is displayed on the operation part, and the user is asked to determine whether it is correct. If it is correct, the step progresses to step S1909.

In step S1906, when there is not the information such as the page number and title number by which the page order can be discriminated in the document, and when the user specifies that the page order automatically determined in step S1907 is corrected, the step progresses to step S1908.

In step S1908, the user inputs the page arrangement order of the document that is the direction of N or the direction of Z according to UI of the operation part.

Next, in step S1909, the user performs the print setting.

In step S1910, the user can specify N-up freely. For example, even in the case of the original document being 4-up, it can be altered into 2-up. This is because, when the original document is 4-up, since the N-up number has been determined, it can be converted into 1-up and furthermore, the conversion from 1-up to N-up (N≧2) is possible. In the case of the conversion to 1-up, since the document is the vector data, and is the resolution independent data, degradation of the image quality due to the scaling does not arise. By using the 1-up document, the printing according to the print setting in step S1909 is performed in step S1912.

In the embodiment 1, page order determination is performed at the time of printing, but may be performed at the time of scanning. Thereby, it becomes possible to perform the printing without making the user take time at the time of the printing.

Embodiment 2

Next, document generation processing in a second embodiment according to the present invention, will be described using a flow chart of FIG. 20.

Figure 20:
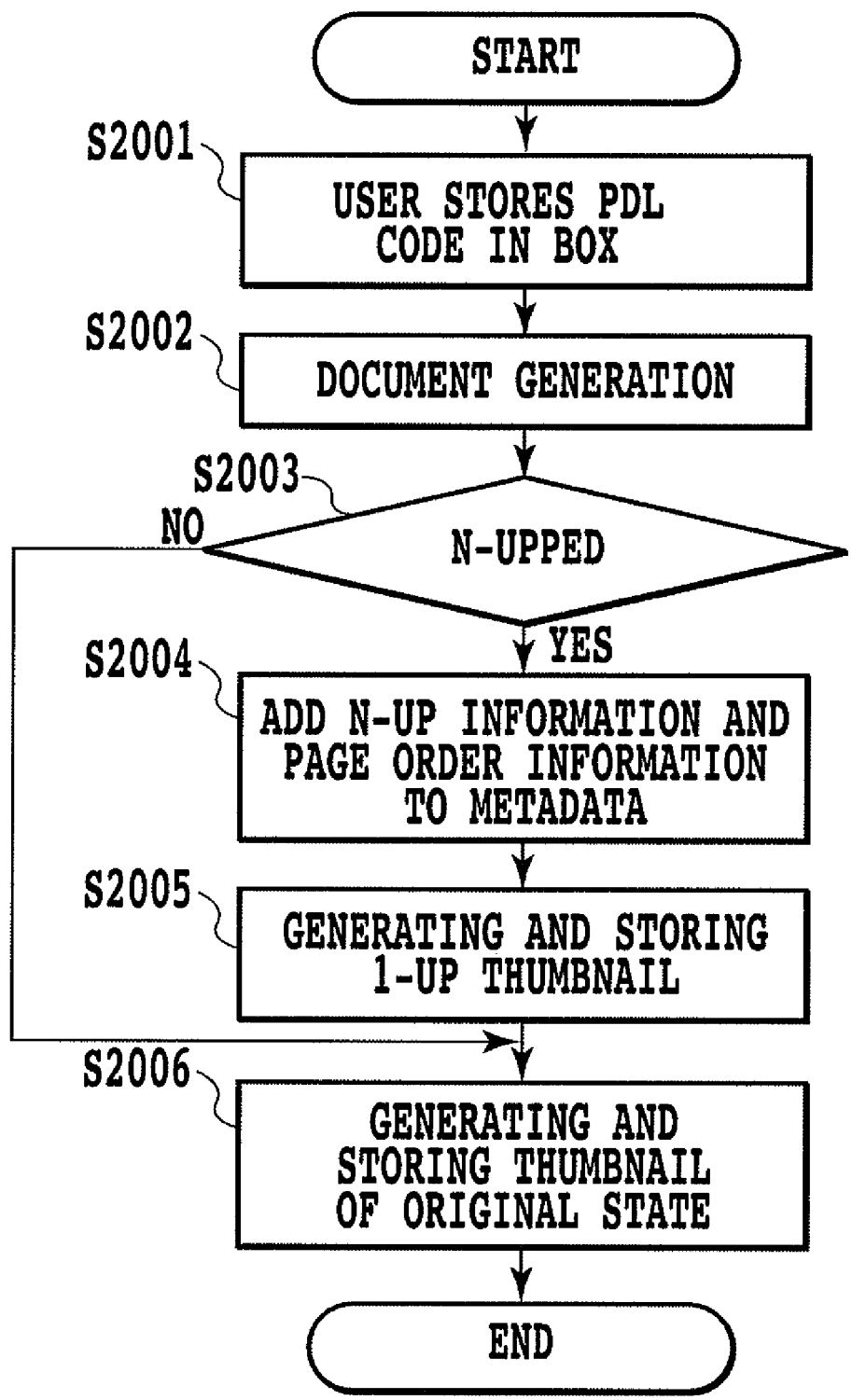
FIG. 20 is a flow chart describing document generation processing at the time of performing box-storing of an inputted PDL code in a second embodiment of the present invention.

FIG. 20 illustrates the document generation processing at the time of storing the inputted PDL code in the box. This processing performs the N-up determination from the PDL code, and generates the document with the N-up information added thereto. Since the device configuration and other processing in the present embodiment are the same as those of the embodiment 1 mentioned above, the description will be omitted.

First, according to the user's instructions in step S2001, the processing that stores the inputted PDL code in the box is performed.

Next, in step S2002, the document holding the vector data, metadata and display list mentioned above using FIG. 11 is generated from the PDL code.

Next, in step S2003, it is discriminated based on the information in the PDL code whether the document based on the PDL code is N-upped. When it is N-upped, the N-up information and the page order information are added to the metadata in step S2004.

Then, a thumbnail having a configuration of the 1-up document is generated and stored in step S2005.

Furthermore, in step S2006, a thumbnail is generated from the document (that is, the N-up document) of the original state, and is stored.

In the above, the document generation processing in the second embodiment has been described.

According to the embodiments 1 and 2 mentioned above, by extracting automatically one page region and generating a thumbnail thereof for scan data of a N-upped paper document, the display can be performed in a state of the 1-up document in the preview. Thereby, since the visibility in the preview is enhanced and at the same time, an automatic 1-up document display becomes possible, the operability is improved.

Also at the time of printing, it is possible to alter the layout number in the N-upped paper document arbitrarily, and to perform the printing thereof without any image quality degradation.

Other Embodiments

As mentioned above, various embodiments have been described in full detail, and the present invention may be applied to a system made up of a plurality of devices, and may be applied to an apparatus made up of one device. For example, the devices are such as a scanner, a printer, a PC, a copying machine, a multifunction device, and a facsimile device.

The present invention is realized even by supplying the system or the apparatus with a software program that realizes each function of the embodiments mentioned above directly or remotely, and also realized by that a computer included in the system, or the like, reads and executes the supplied program code. Therefore, in order to realize the function and processing of the present invention by the computer, the program code itself installed in the computer is what realizes the present invention. That is, the computer program itself for realizing the function and processing mentioned above belongs to the present invention.

In that case, the computer program may be in any configuration such as a object code, a program executed by an interpreter, a script data supplied to an OS, if it has the function of the program.

As a computer-readable recording medium for supplying the program, there exist a flexible disk, a hard disk, an optical disk, a magneto-optic disk, a MO, a CD-ROM, a CD-R, a CD-RW, or the like, for example. As a recording medium, there also exists a magnetic tape, a memory card of nonvolatile, a ROM, a DVD (DVD-ROM, DVD-R), or the like.

The program may be downloaded from a website of Internet/Intranet using a browser of a client computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-183899, filed Jul. 15, 2008, which is hereby incorporated by reference herein in its entirety.

What is claimed is:

1. An image processing device, comprising:
    a determining unit for determining whether image data corresponding to an input document is image data of an N-up document (N≧2) or image data of a 1-up document, wherein the N-up document is a document in which contents corresponding to N pages (N≧2) are arranged in one page;
    a first thumbnail generating unit for generating a plurality of first thumbnails as 1-up documents from each of the N pages arranged in the one page of the N-up document when the image data corresponding to the input document is determined to be the image data of the N-up document by the determining unit;
    a second thumbnail generating unit for generating a second thumbnail that is a thumbnail of the input document;
    a storage unit for storing both of the first thumbnails and the second thumbnail in a case where the image data corresponding to the input document is determined to be the image data of the N-up document by the determining unit, and storing the second thumbnail in a case where the image data corresponding to the input document is determined to be the image data of 1-up document by the determining unit; and
    a display unit for preview-displaying the first thumbnails generated from the image data of the N-up document by the first thumbnail generating unit and the second thumbnail generated from the image data of the 1-up document by the second thumbnail generating unit when an automatic 1-up preview is set, and preview-displaying the second thumbnail generated from the image data of the N-up document by the second thumbnail generating unit and the second thumbnail generated from the image data of the 1-up document by the second thumbnail generating unit when the automatic 1-up preview is not set.

2. The image processing device according to claim 1, wherein, when an original N-up display is instructed for the preview-displayed first thumbnails by a user, the display unit preview-displays the second thumbnail generated from the image data of the N-up document instead of the first thumbnails.

3. The image processing device according to claim 1, further comprising:
    an input unit for receiving an input of layout print information that is information regarding layout print of a layout-printed image,
    wherein the determining unit carries out the determination based on the layout print information when the layout print information is input from the input unit.

4. The image processing device according to claim 1, further comprising:
    a region dividing unit for performing region division processing for the image data of the document to detect objects included in the document,
    wherein the determining unit determines that the document is the N-up document when it is determined, from the result of the region division processing, that a certain page in the document is divided equally, and the similar object exists in every region divided equally in the page.

5. The image processing device according to claim 3, further comprising:
a discriminating unit for discriminating a page order of the document of the layout-printed image based on the detected object; and
a printing unit for printing the document based on the discriminated page order.

6. The image processing device according to claim 5, wherein the printing unit performs the layout print of the document with an arbitrary layout number.

7. The image processing device according to claim 1, wherein when the same document as the document to be determined exists separately, the determining unit performs the determination using information of the same document.

8. The image processing device according to claim 1, wherein the display unit preview-displays each of the generated first thumbnails so that they can be scrolled in order.

9. An image processing method implemented in a computer, comprising the steps of:
determining whether image data corresponding to an input document is image data of an N-up document (N≧2) or image data of a 1-up document, wherein the N-up document is a document in which contents corresponding to N pages (N≧2) are arranged in one page;
generating a plurality of first thumbnails as 1-up documents from each of the N pages arranged in the one page of the N-up document when the image data corresponding to the input document is determined to be the image data of the N-up document in the determining step;
generating a second thumbnail that is a thumbnail of the input document;
storing both of the first thumbnails and the second thumbnail in a case where the image data corresponding to the input document is determined to be the image data of the N-up document in the determining step, and storing the second thumbnail in a case where the image data corresponding to the input document is determined to be the image data of 1-up document in the determining step;
preview-displaying, on a display screen, the first thumbnails generated from the image data of the N-up document and the second thumbnail generated from the image data of the 1-up document when an automatic 1-up preview is set; and
preview-displaying, on the display screen, the second thumbnail generated from the image data of the N-up document and the second thumbnail generated from the image data of the 1-up document when the automatic 1-up preview is not set.

10. A non-transitory computer-readable storage medium storing a program for causing a computer to execute an image processing method in an image processing device, the program causing the computer to execute the steps of:
determining whether or not image data corresponding to an input document is image data of an N-up document (N≧2) or image data of a 1-up document, wherein the N-up document is a document in which contents corresponding to N pages (N≧2) are arranged in one page;
generating a plurality of first thumbnails as 1-up documents from each of the N pages arranged in the one page of the N-up document when the image data corresponding to the input document is determined to be the image data of the N-up document in the determining step;
generating a second thumbnail that is a thumbnail of the input document;
storing both of the first thumbnails and the second thumbnail in a case where the image data corresponding to the input document is determined to be the image data of the N-up document in the determining step, and storing the second thumbnail in a case where the image data corresponding to the input document is determined to be the image data of 1-up document in the determining step;
preview-displaying, on a display screen, the first thumbnail generated from the image data of the N-up document and the second thumbnail generated from the image data of the 1-up document when an automatic 1-up preview is set; and
preview-displaying, on the display screen, the second thumbnail generated from the image data of the N-up document and the second thumbnail generated from the image data of the 1-up document when the automatic 1-up preview is not set.

* * * * *